United States Patent
Maruyama et al.

(10) Patent No.: US 11,590,678 B2
(45) Date of Patent: Feb. 28, 2023

(54) MATERIAL FEEDING DEVICE, INJECTION MOLDING DEVICE, AND THREE-DIMENSIONAL MODELING DEVICE

(71) Applicant: Seiko Epson Corporation, Toyko (JP)

(72) Inventors: Hidenobu Maruyama, Azumino (JP); Kenta Anegawa, Matsumoto (JP)

(73) Assignee: SEIKO EPSON CORPORATION

( * ) Notice: Subject to any disclaimer, the term of this patent is extended or adjusted under 35 U.S.C. 154(b) by 56 days.

(21) Appl. No.: 17/332,061

(22) Filed: May 27, 2021

(65) Prior Publication Data

US 2021/0370564 A1    Dec. 2, 2021

(30) Foreign Application Priority Data

May 28, 2020   (JP) .............................. JP2020-093408

(51) Int. Cl.
| | |
|---|---|
| *B29C 45/18* | (2006.01) |
| *B29C 64/393* | (2017.01) |
| *B29C 64/329* | (2017.01) |
| *B33Y 50/02* | (2015.01) |
| *B33Y 30/00* | (2015.01) |

(52) U.S. Cl.
CPC ........ *B29C 45/1808* (2013.01); *B29C 64/329* (2017.08); *B29C 64/393* (2017.08); *B33Y 30/00* (2014.12); *B33Y 50/02* (2014.12); *B29C 45/18* (2013.01); *B29C 2945/7613* (2013.01); *B29C 2945/76331* (2013.01)

(58) Field of Classification Search
CPC ... B29C 45/18; B29C 45/1808; B29C 64/329; B29C 64/393; B29C 2945/76331; B29C 2945/7613; B33Y 30/00; B33Y 50/02

USPC ........................................................ 425/162
See application file for complete search history.

(56) References Cited

FOREIGN PATENT DOCUMENTS

| JP | 2010-131905 A |   | 6/2010 |
| JP | 2010131905 A | * | 6/2010 |

OTHER PUBLICATIONS

JP2010131905A, Oike, published Jun. 17, 2010, machine translation to English. (Year: 2010).*

* cited by examiner

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

The material feeding device is configured so that in the state in which a hopper having an opening part and containing a material is attached to a coupling member configured so that the hopper is detachably attached to the coupling member, when the hopper is located in a first area, a first member configured to be able to make a sliding displacement on a slide surface having the first area where a feed hole is disposed makes the sliding displacement to a third area different from the first area to make it possible to take a communicated state in which the opening part and the feed hole are communicated with each other, and when the hopper is located in a second area, the first member makes a sliding displacement to the first area to make it possible to take a non-communicated state in which the first member covers the feed hole. The material feeding device takes the non-communicated state at least when the hopper is detached from the coupling member via a detachably attaching part disposed in the second area extending along a direction in which the first area extends.

14 Claims, 16 Drawing Sheets

MATERIAL FEEDING DEVICE, INJECTION MOLDING DEVICE, AND THREE-DIMENSIONAL MODELING DEVICE

The present application is based on, and claims priority from JP Application Serial Number 2020-093408, filed May 28, 2020, the disclosure of which is hereby incorporated by reference herein in its entirety.

BACKGROUND

1. Technical Field

The present disclosure relates to a material feeding device, an injection molding device, and a three-dimensional modeling device.

2. Related Art

Regarding a material feeding device provided to an injection molding device and so on, in JP-A-2010-131905 (Document 1), there is disclosed a hopper unit provided with a hopper detachably attached to a hopper cradle. In the hopper unit, the hopper is provided with a discharge port which can be opened and closed, and in a state in which the hopper is separated from the hopper cradle, the discharge port is closed to thereby prevent scattering of a material from the hopper due to the separation.

In such a hopper unit as described in Document 1, the hopper cradle is provided with a feed hole, and the material in the hopper is fed to a main body part and so on of the injection molding device communicated with the feed hole via the feed hole. Therefore, there is a possibility that the feed hole is opened due to the separation of the hopper from the hopper cradle, and a foreign matter enters the main body part and so on via the feed hole.

SUMMARY

According to a first aspect of the present disclosure, there is provided a material feeding device. The material feeding device includes a hopper which has an opening part, and is configured to contain a material, and a coupling member configured so that the hopper is detachably attached to the coupling member, wherein the coupling member includes a slide surface having a first area where a feed hole is disposed, a first member configured to make a sliding displacement on the slide surface, and a detachably attaching part which is disposed in a second area extending along a direction in which the first area extends, and with which the hopper is detachably attached to the coupling member. In the attached state in which the hopper is attached to the coupling member, there is adopted a configuration in which when the hopper is located in the first area, the first member makes a sliding displacement to a third area different from the first area to thereby take a communicated state in which the opening part and the feed hole are communicated with each other, and there is adopted a configuration in which when the hopper is located in the second area, the first member makes a sliding displacement to the first area to thereby take a non-communicated state in which the first member covers the feed hole, and the non-communicated state is taken at least when the hopper is detached from the coupling member via the detachably attaching part.

According to a second aspect of the present disclosure, there is provided an injection molding device. The injection molding device includes the material feeding device according to the first aspect described above, a plasticizing section configured to plasticize the material fed from the material feeding device to generate a plasticized material, and an injection nozzle configured to inject the plasticized material into a molding die.

According to a third aspect of the present disclosure, there is provided a three-dimensional modeling device. The three-dimensional modeling device includes the material feeding device according to the first aspect described above, a plasticizing section configured to plasticize the material fed from the material feeding device to generate a plasticized material, and an ejection nozzle configured to eject the plasticized material toward a stage.

DESCRIPTION OF EXEMPLARY EMBODIMENTS

A. First Embodiment

Figure 1:
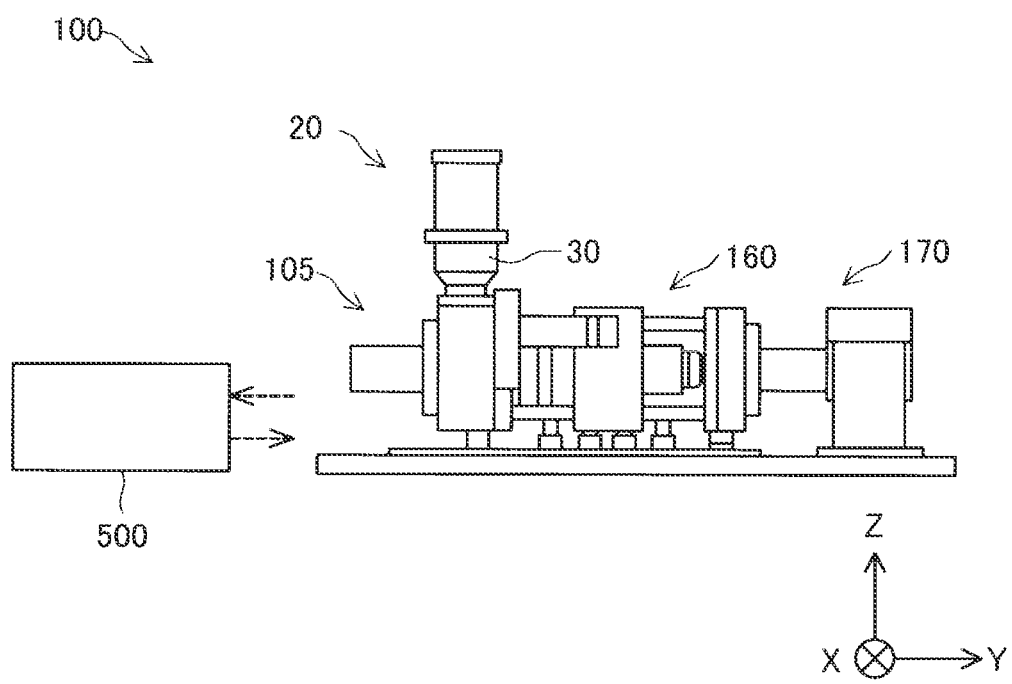
FIG. 1 is a diagram showing a schematic configuration of an injection molding device according to a first embodiment.

FIG. 1 is a diagram showing a schematic configuration of an injection molding device 100 according to the present embodiment. In FIG. 1, there are shown the arrows along X, Y, and Z directions perpendicular to each other, respectively. The X, Y, and Z directions are directions along an X axis, a Y axis, and a Z axis as three spatial axes perpendicular to each other, and each include both of a direction toward one side along the X axis, the Y axis, or the Z axis, and the opposite direction thereof. The X axis and the Y axis are axes along a horizontal plane, and the Z axis is an axis along a vertical line. In other drawings, there are arbitrarily shown the arrows along the X, Y, and Z directions, respectively. The X, Y, and Z directions in FIG. 1 and the X, Y, and Z directions in other drawings represent the same directions, respectively.

The injection molding device 100 is provided with a material feeding device 20, an injection unit 105, a mold part 160, a mold clamping device 170, and a control section 500. The injection molding device 100 plasticizes a material fed from the material feeding device 20 to generate a plasticized material, and then injects the plasticized material to the mold part 160 to thereby mold a molded object using the injection unit 105.

Figure 2:
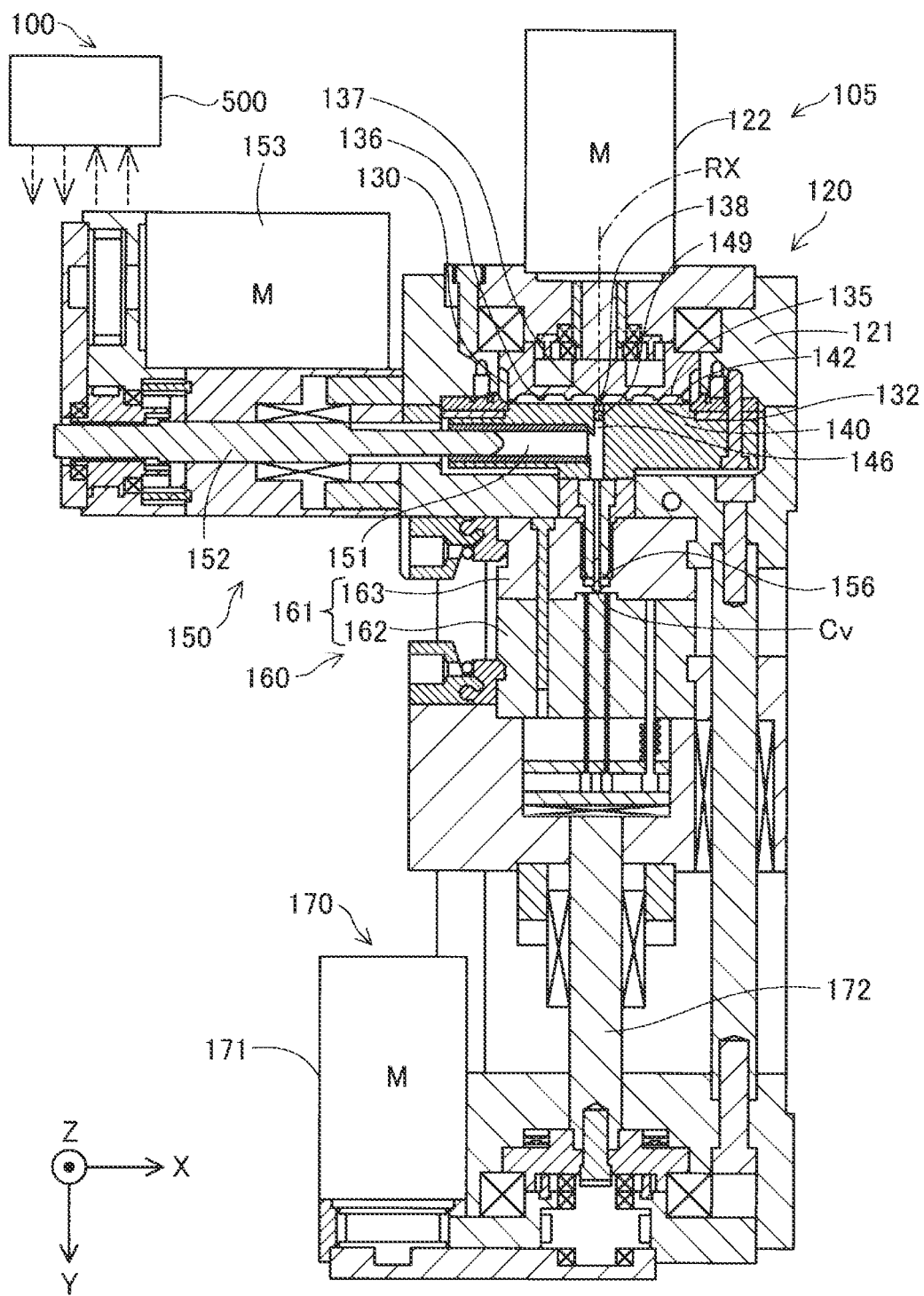
FIG. 2 is a cross-sectional view showing the schematic configuration of the injection molding device according to the first embodiment.

FIG. 2 is a cross-sectional view showing a schematic configuration of the injection molding device 100. In FIG. 2, there are shown the injection unit 105, the mold part 160, the mold clamping device 170, and the control section 500 of the injection molding device 100. The injection unit 105 is provided with a plasticizing section 120, an injection control section 150, and an injection nozzle 156.

The control section 500 is a device for performing control of the injection unit 105 and the mold clamping device 170. The control section 500 is constituted by, for example, a computer provided with one or more processors, a main storage device, and an input/output interface, and a combination of a plurality of circuits.

The material feeding device 20 according to the present embodiment shown in FIG. 1 feeds the material to the plasticizing section 120 shown in FIG. 2. Specifically, the material feeding device 20 feeds the material in the hopper 30 for containing the material to the plasticizing section 120 located outside the hopper 30. In the hopper 30, there is housed the material in the form of, for example, a pellet or a powder. It should be noted that the details of the material feeding device 20 will be described later.

The plasticizing section 120 is provided with a rotor case 121, a drive motor 122, a rotor 130, a barrel 140, and a check valve 149. The plasticizing section 120 plasticizes at least a part of the material fed from the material feeding device 20 to generate the plasticized material like a paste having fluidity, and then guides the plasticized material to the injection control section 150. The term "plasticize" means that the material having a thermoplastic property is heated at a temperature no lower than the glass-transition point to thereby be softened, and thus, the fluidity is developed. The term "melt" not only means that the material having a thermoplastic property is heated at a temperature no lower than the melting point to thereby be in a liquid form, but also means that the material having the thermoplastic property is plasticized. It should be noted that the rotor 130 in the present embodiment is called a "scroll" or a "flat screw" in some cases, or is simply called a "screw" in some cases.

The rotor 130 has a substantially cylindrical shape smaller in height in a direction along a central axis RX than the diameter. The rotor 130 is housed in a space surrounded by the rotor case 121 and the barrel 140. The rotor 130 has a groove forming surface 132 provided with grooves 135 on a surface opposed to the barrel 140. Specifically, the groove forming surface 132 is opposed to an opposed surface 142 of the barrel 140. The groove forming surface 132 is provided with protruding line parts 136 each having a curved shape. It should be noted that the central axis RX is referred to as a rotational axis of the rotor 130 in some cases. In FIG. 2, the central axis RX is represented by a dashed-dotted line.

To a surface of the rotor 130 at the opposite side to the groove forming surface 132, there is coupled the drive motor 122. Due to the torque generated by the drive motor 122, the rotor 130 rotates around the central axis RX as the rotational axis. The drive motor 122 is driven under the control by the control section 500. It should be noted that the drive motor 122 is not required to directly be coupled to the rotor 130. For example, it is possible for the rotor 130 and the drive motor 122 to be coupled to each other via a reduction mechanism. In this case, it is possible to adopt a configuration in which, for example, the drive motor 122 is coupled to a planet gear of the reduction mechanism having a planetary gear train, and the rotor 130 is coupled to a sun gear.

Figure 3:
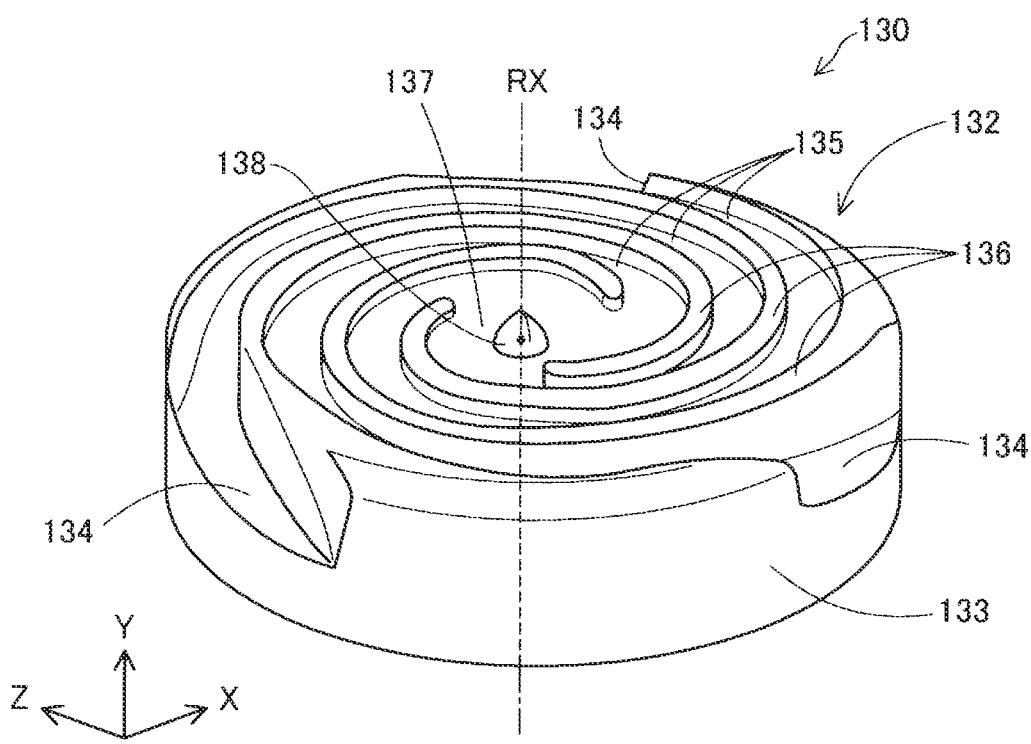
FIG. 3 is a perspective view showing a configuration at a groove forming surface side of a rotor.

FIG. 3 is a perspective view showing a configuration at the groove forming surface 132 side of the rotor 130. In FIG. 3, a position of the central axis RX of the rotor 130 is represented by the dashed-dotted line. As described above, the groove forming surface 132 is provided with the grooves 135.

The grooves 135 of the rotor 130 each form a so-called scrolling groove. The grooves 135 each extend in a vertical manner from a central part 137 toward an outer circumference of the rotor 130 so as to draw an arc. The grooves 135 can also be formed so as to extend forming an involute-curved shape or a spiral shape. The groove forming surface 132 is provided with the protruding line parts 136 each constituting a sidewall part of the groove 135, and extending along each of the grooves 135. The grooves 135 each continue to a material introduction port 134 formed on a side surface 133 of the rotor 130. The material introduction ports 134 are each a portion for taking the material in the groove 135. The material fed from the material feeding device 20 is fed between the rotor 130 and the barrel 140 via the material introduction ports 134.

The central part 137 of the groove forming surface 132 of the rotor 130 is formed as a recess to which one ends of the grooves 135 are coupled. As shown in FIG. 2, the central part 137 is opposed to a communication hole 146 provided to the opposed surface 142 of the barrel 140. The central part 137 crosses the central axis RX.

The rotor 130 in the present embodiment is provided with a retention inhibition part 138 protruding toward the communication hole 146. In the present embodiment, the retention inhibition part 138 has a substantially conical shape, and a central axis of the retention inhibition part 138 substantially coincides with the central axis RX of the rotor 130. A tip of the retention inhibition part 138 is disposed at an inner side of the communication hole 146 from an opening end of the communication hole 146 in the opposed surface 142. Since the plasticized material in the central part 137 is efficiently guided by the retention inhibition part 138 to the communication hole 146, the retention of the plasticized material is prevented. The retention of the plasticized material is also referred to as "stagnation" in some cases.

In FIG. 3, there is shown an example of the rotor 130 having three grooves 135 and three protruding line parts 136. The number of the grooves 135 and the number of the protruding line parts 136 provided to the rotor 130 are not limited to three. The rotor 130 can be provided with just one groove 135, or can also be provided with a plurality of, namely two or more, grooves 135. Further, it is also possible to dispose an arbitrary number of protruding line parts 136 in accordance with the number of the grooves 135.

In FIG. 3, there is illustrated an example of the rotor 130 having the material introduction ports 134 formed at three places. The number of the places where the material introduction ports 134 are disposed in the rotor 130 is not limited to three. It is possible to dispose the material introduction port 134 at just one place in the rotor 130, or to dispose the material introduction ports 134 at a plurality of places, namely two or more places, in the rotor 130.

Figure 4:
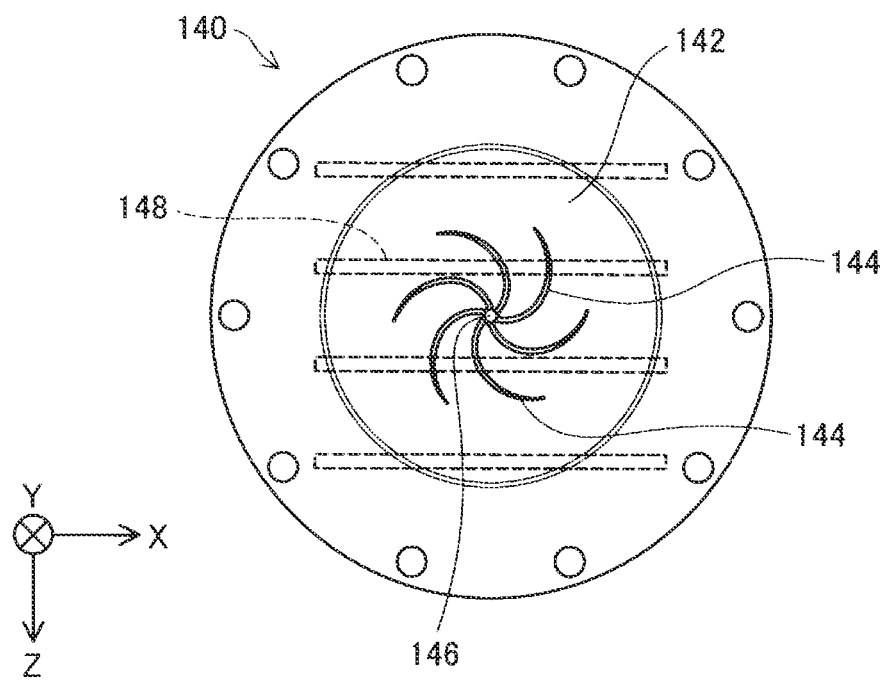
FIG. 4 is an explanatory diagram showing a configuration at an opposed surface side of a barrel.

FIG. 4 is an explanatory diagram showing a configuration at the opposed surface 142 side of the barrel 140. As described above, the opposed surface 142 is a surface opposed to the groove forming surface 132 of the rotor 130. At the center of the opposed surface 142, there is disposed the communication hole 146 communicated with the injection nozzle 156 shown in FIG. 2. On the periphery of the communication hole 146 in the opposed surface 142, there is formed a plurality of guide grooves 144. Each of the guide grooves 144 is coupled to the communication hole 146 in one end, and extends in a spiral shape from the communication hole 146. Each of the guide grooves 144 has a function of guiding the plasticized material to the communication hole 146. It should be noted that it is not required to provide the guide grooves 144 to the barrel 140.

As shown in FIG. 4, a heating section 148 is disposed in the barrel 140. The heating section 148 heats the material fed between the rotor 130 and the barrel 140. In the present embodiment, the heating section 148 is formed of four heaters disposed in the barrel 140. The output of the heating section 148 is controlled by the control section 500.

As shown in FIG. 2, the check valve 149 is disposed inside the communication hole 146. The check valve 149 inhibits a reverse flow of the plasticized material from the communication hole 146 toward the central part 137 and the grooves 135 of the rotor 130.

The plasticizing section 120 heats the material while conveying the material toward the communication hole 146 due to the rotation of the rotor 130 and the heating by the heating section 148 described above to thereby form the plasticized material, and then discharges the plasticized material thus formed from the communication hole 146. In particular, the plasticized material in the communication hole 146 is measured in weight by the injection control section 150, and is then fed to the injection nozzle 156.

As shown in FIG. 2, the injection control section 150 is provided with a cylinder 151, a plunger 152, and a plunger drive section 153. The cylinder 151 is a member which has a substantially cylindrical shape, and is coupled to the communication hole 146 of the barrel 140. The plunger 152 moves inside the cylinder 151. The plunger 152 is driven by the plunger drive section 153 constituted by a motor, gears, and so on. The plunger drive section 153 is controlled by the control section 500.

The injection control section 150 slides the plunger 152 in the cylinder 151 to thereby perform a weighing operation and an injection operation under the control by the control section 500. The weighing operation means an operation of moving the plunger 152 toward the −X direction of getting away from the communication hole 146 to thereby guide the plasticized material in the communication hole 146 to the inside of the cylinder 151, and then measuring the weight of the plasticized material inside the cylinder 151. The injection operation means an operation of moving the plunger 152 toward the +X direction of coming closer to the communication hole 146 to thereby inject the plasticized material located inside the cylinder 151 into a molding die via the injection nozzle 156.

As described above, the injection nozzle 156 is communicated with the communication hole 146. By performing the weighing operation and the injection operation described above, the plasticized material measured in weight in the cylinder 151 is fed from the injection control section 150 to the injection nozzle 156 via the communication hole 146, and is then injected from the injection nozzle 156 into the mold part 160.

The mold part 160 has a molding die 161. The plasticized material fed to the injection nozzle 156 is injected from the injection nozzle 156 into a cavity Cv of the molding die 161. Specifically, the molding die 161 has a movable mold 162 and a stationary mold 163 opposed to each other, and has the cavity Cv between the movable and stationary molds. The cavity Cv is a space corresponding to a shape of the molded object. In the present embodiment, the movable mold 162 and the stationary mold 163 are each formed of a metal material. It should be noted that it is possible for the movable mold 162 and the stationary mold 163 to be formed of a ceramics material or a resin material.

The mold clamping device 170 is provided with a mold drive section 171 and a ball screw part 172. The mold drive section 171 is constituted by a motor, gears, and so on, and is coupled to the movable mold 162 via the ball screw part 172. The drive by the mold drive section 171 is controlled by the control section 500. The ball screw part 172 transmits the power of the drive by the mold drive section 171 to the movable mold 162. The mold clamping device 170 moves the movable mold 162 using the mold drive section 171 and the ball screw part 172 under the control by the control section 500 to thereby perform opening and closing of the mold part 160.

Figure 5:
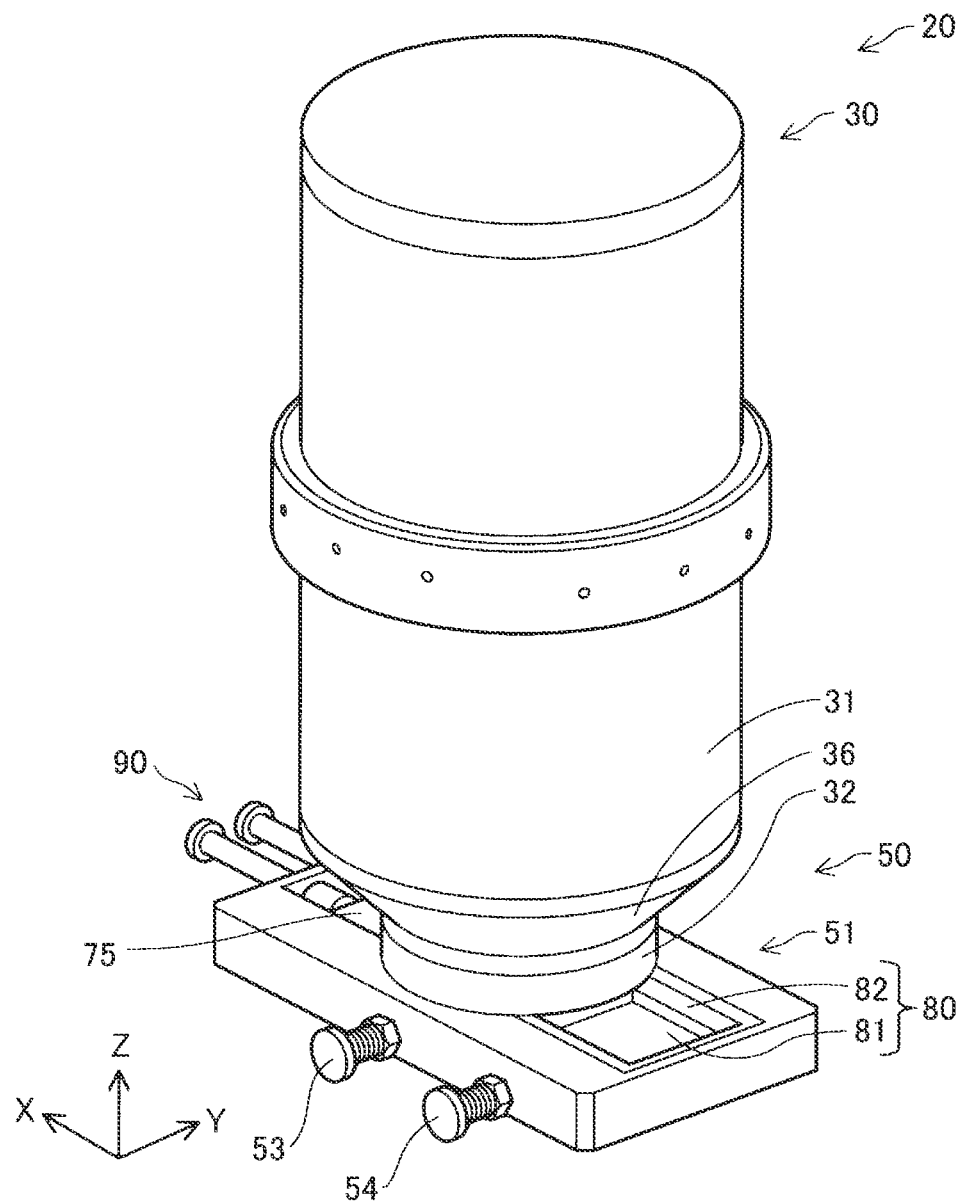
FIG. 5 is a perspective view of a material feeding device.

FIG. 5 is a perspective view of the material feeding device 20. As shown in FIG. 5, the material feeding device 20 is provided with the hopper 30 described above, and a coupling member 50. Further, the material feeding device 20 in the present embodiment is provided with a second member 80.

Figure 6:
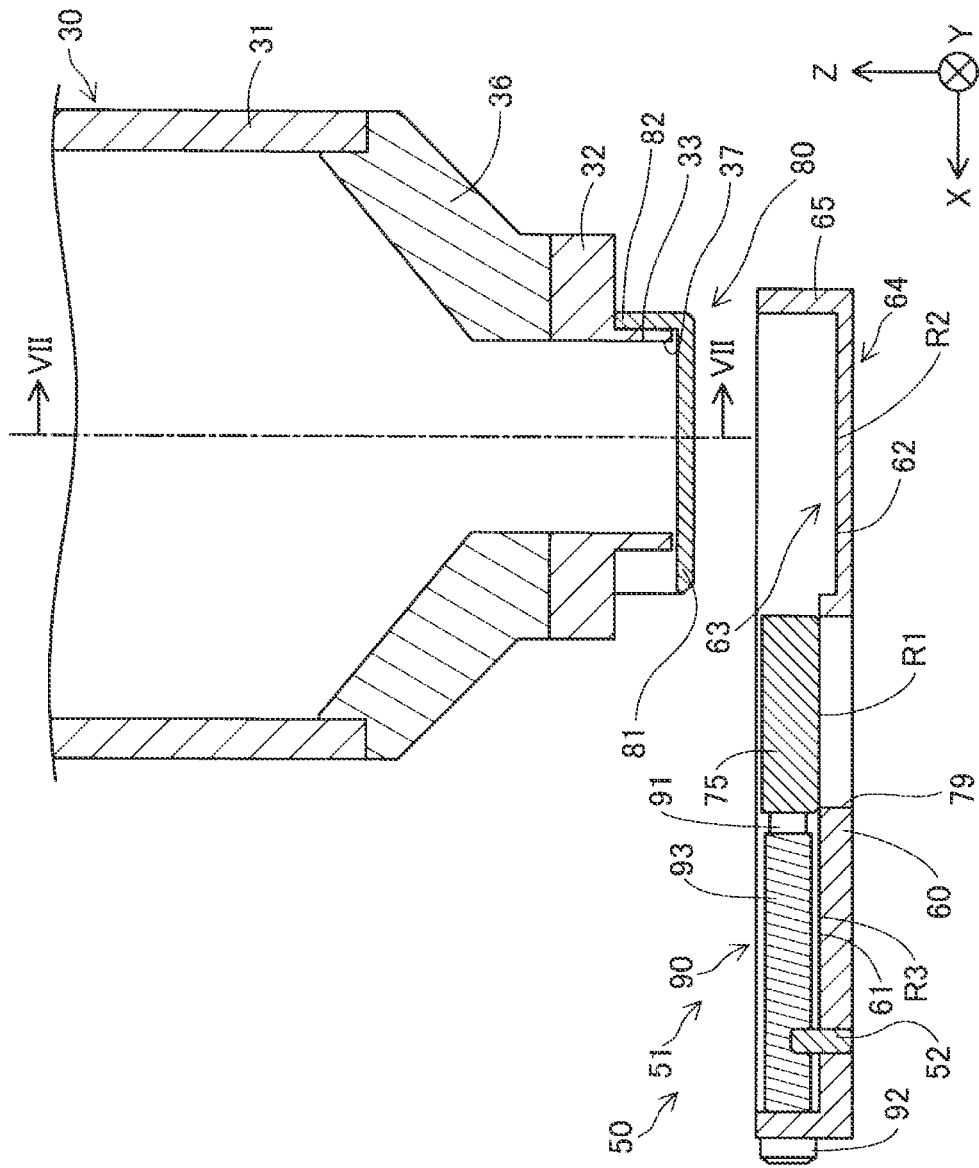
FIG. 6 is a diagram showing a cross-sectional surface of the material feeding device in a detached state according to the first embodiment.

FIG. 6 is a diagram showing a cross-sectional surface of the material feeding device 20 in a detached state. The detached state means the state in which the hopper 30 is detached from the coupling member 50. In contrast, in FIG. 5, there is shown an appearance of the material feeding device 20 in an attached state in which the hopper 30 is attached to the coupling member 50. As shown in FIG. 5 and FIG. 6, in the material feeding device 20, the hopper 30 is configured to detachably be attached to the coupling member 50. It should be noted that the details of detachment/attachment of the hopper 30 from/to the coupling member 50 will be described later.

As shown in FIG. 5 and FIG. 6, the hopper 30 in the present embodiment has a body part 31 and a mouth part 32. The body part 31 has a substantially cylindrical shape. The mouth part 32 has a cylindrical shape thinner than the body part 31. The mouth part 32 is disposed at the lower side, namely at the −Z direction side, of the body part 31. The body part 31 and the mouth part 32 are continued via a continuous part 36 having a substantially circular truncated cone like outer shape. It should be noted that the hopper 30 can be configured so that, for example, a part in the axial direction of the body part 31 can be detached, or can have a net or the like through which a pellet can pass disposed in the middle in the axial direction of the body part 31.

As shown in FIG. 6, a coupling part 33 is disposed in the lowermost part of the hopper 30, namely a lower part of the mouth part 32. The coupling part 33 in the present embodiment has a substantially quadrangular prismatic outer shape which is flat in the X direction and the Y direction. The coupling part 33 is provided with an opening part 37 having a substantially circular shape. The material in the hopper 30 is fed to the outside of the hopper 30 via the opening part 37.

As shown in FIG. 6, the second member 80 covers the opening part 37 in the detached state. Specifically, the second member 80 has a lid part 81 which is shaped like a flat plate and covers the opening part 37, and a wall part 82 formed so as to rise toward the +Z direction from the lid part 81. The lid part 81 has a substantially rectangular shape when viewed along the Z direction. The wall part 82 is formed so as to surround the −X direction side, the +Y direction side, and the −Y direction side of the mouth part 32 in the detached state. It should be noted that when using the expression that "the second member 80 covers the opening part 37," the second member 80 is not required to completely cover the opening part 37, and it is sufficient for the second member 80 to cover the opening part 37 to the extent that the material in the hopper 30 is not scattered via the opening part 37. For example, it is sufficient for the second member 80 to be formed of a net like member which blocks the pellet, or it is possible to open a microscopic gap which blocks the pellet when the second member 80 covers the opening part 37.

Figure 7:
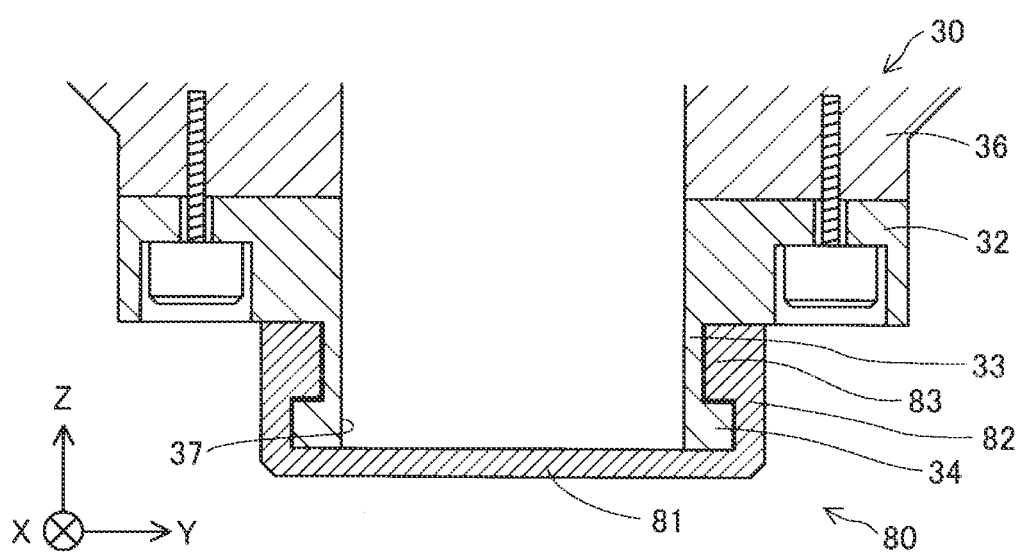
FIG. 7 is a diagram showing a cross-sectional surface of a hopper and a second member along the cross-sectional line VII-VII in FIG. 6.

FIG. 7 is a diagram showing a cross-sectional surface of the hopper 30 and the second member 80 along the cross-sectional line VII-VII in FIG. 6. As shown in FIG. 7, in the present embodiment, there is adopted a configuration in which a first engagement part 34 provided to the coupling part 33 of the hopper 30 and a second engagement part 83 of the second member 80 can be engaged with each other. The first engagement part 34 and the second engagement part 83 are configured so that the engaged state and the state in which the engagement is released can be switched due to a relative displacement along the X direction of the hopper 30 and the second member 80. Specifically, the wall part 82 has a shape overhanging the lid part 81, and the second engagement part 83 is constituted by the lid part 81 and the wall part 82. The first engagement part 34 is configured to be able to engage with the second engagement part 83 from the +X direction side of the second engagement part 83.

As shown in FIG. 5 and FIG. 6, the coupling member 50 has a main body part 51 and a first member 75, and further has biasing parts 90. The coupling member 50 in the present embodiment is fixed to the +Z direction side of the plasticizing section 120 shown in FIG. 2 by the main body part 51 being fixed via a bolt, an adhesive, or the like not shown. The coupling member 50 can be fixed to a member constituting the injection unit 105 other than the plasticizing section 120, or can be configured to detachably be attached to a member constituting the injection unit 105.

As shown in FIG. 6, the main body part 51 has a bottom part 60, a detachably attaching part 64, and a sidewall part 65. It should be noted that the detachably attaching part 64 in the present embodiment is a part constituted by a part of the bottom part 60 and a part of the sidewall part 65.

Figure 8:
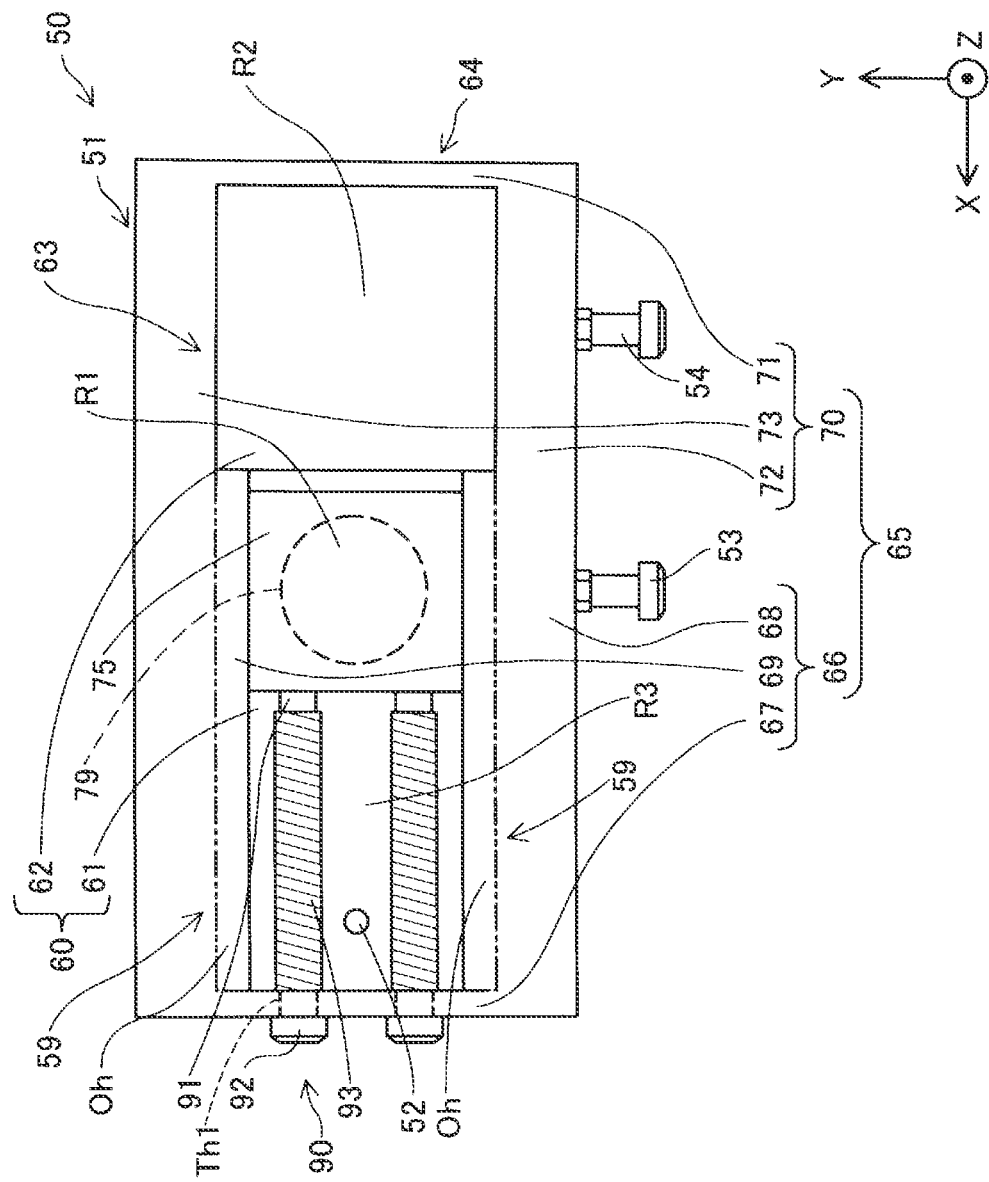
FIG. 8 is a plane view of a coupling member in the first embodiment.

FIG. 8 is a plan view of a coupling member 50. In FIG. 8, there is shown a condition when viewing the coupling member 50 along the Z direction. It should be noted that in FIG. 8, a part of an invisible member out of the coupling member 50 is represented by dotted lines or dashed-two-dotted lines.

As shown in FIG. 6 and FIG. 8, the bottom part 60 has a slide surface 61 and a detachably attaching surface 62. The slide surface 61 in the present embodiment extends along the X direction and the Y direction, and is an end surface at the +Z direction side of the bottom part 60. It should be noted that in FIG. 8, a portion of the slide surface 61 which overlaps an overhang part Oh described later, and is therefore invisible is represented by the dashed-two-dotted lines.

As shown in FIG. 6 and FIG. 8, the slide surface 61 has a first area R1 provided with a feed hole 79. In the present embodiment, the first area R1 is located in the vicinity of a central part in the X direction and the Y direction of the main body part 51. The direction in which the first area R1 extends is referred to as an extension direction in some cases. In the present embodiment, the extension direction is a direction along the X direction and the Y direction. The feed hole 79 is an opening for feeding the material in the hopper 30 to the outside. The feed hole 79 in the present embodiment has a substantially circular shape. It should be noted that in FIG. 8, the feed hole 79 is located at the −Z direction side of the first member 75.

The detachably attaching surface 62 is disposed at the −X direction side of the slide surface 61. The detachably attaching surface 62 is formed as an upper surface of a first recessed part 63 as a portion of the bottom part 60 recessed toward the −Z direction from the slide surface 61. It should be noted that there is adopted a configuration in which the dimension of the first recessed part 63 coincides with the dimension of the lid part 81 of the second member 80. In other words, the dimensions in the X direction and the Y direction of the detachably attaching surface 62 coincide with the dimensions in the X direction and the Y direction of the lid part 81, respectively, and the dimension in the Z direction of the first recessed part 63 coincides with the dimension of the lid part 81.

The sidewall part 65 is formed as a portion rising toward the +Z direction from the bottom part 60. Specifically, the sidewall part 65 has a first sidewall part 66 having a shape which surrounds the slide surface 61 so as to form a U-shape when viewed along the Z direction, and a second sidewall part 70 having a shape which surrounds the detachably attaching surface 62 so as to form a U-shape. The first sidewall part 66 has a first wall 67 located at the +X direction side of the slide surface 61, a second wall 68 located at the −Y direction side thereof, and a third wall 69 located at the +Y direction side thereof when viewed along the Z-direction. The second sidewall part 70 has a fourth wall 71 located at the −X direction side of the detachably attaching surface 62, a fifth wall 72 located at the −Y direction side thereof, and a sixth wall 73 located at the +Y direction side thereof. Therefore, it can be said that the slide surface 61 and the detachably attaching surface 62 in the present embodiment constitute an upper surface of a portion of the main body part 51 which is surrounded by the sidewall part 65, and which is recessed toward the −Z direction with respect to the sidewall part 65.

As shown in FIG. 8, in the present embodiment, the second wall 68 and the third wall 69 each have the overhang part Oh overhanging the slide surface 61. In the main body part 51, the slide surface 61, and the second wall 68 and the third wall 69 each having the overhang part Oh constitute a third engagement part 59 which can engage with the first engagement part 34 of the hopper 30. The first engagement part 34 can engage with the third engagement part 59 from the −X direction side of the third engagement part 59.

The detachably attaching part 64 is a portion for detachably attaching the hopper 30 to the coupling member 50. The detachably attaching part 64 is disposed in a second area R2 of the coupling member 50. The second area R2 is an area extending along the X direction as the extension direction and the Y direction. In the present embodiment, the second area R2 is disposed adjacent to the slide surface 61. Specifically, the second area R2 is located at the −X direction side of the slide surface 61. As described above, in the present embodiment, the detachably attaching part 64 is constituted by the detachably attaching surface 62 and the second sidewall part 70 as a part of the sidewall part 65.

The first member 75 is a member configured to be able to make a sliding displacement on the slide surface 61. As shown in FIG. 6 and FIG. 8, the first member 75 in the present embodiment has a rectangular solid shape which is flat in the X direction and the Y direction, and is disposed on the slide surface 61. The dimension in the Y direction of the first member 75 is substantially equal to a distance between the overhang parts Oh, and the dimension in the X direction of the first member 75 is smaller than the dimension in the X direction of the slide surface 61. Thus, it is possible for the first member 75 in the present embodiment to move on the slide surface 61 along the X direction so as to slide on the slide surface 61 and the first sidewall part 66. It should be noted that the sliding displacement of a member such as the first member 75 on the slide surface 61 is referred to simply as a sliding displacement in some cases. Further, the first member 75 can have, for example, a shape of engaging with the third engagement part 59, or can be configured so as be able to make the sliding displacement so as to slide on the second wall 68 and the third wall 69 in an area below the overhang parts Oh.

As shown in FIG. 6 and FIG. 8, the biasing parts 90 in the present embodiment each have a shaft part 91 and an elastic part 93. As shown in FIG. 5 and FIG. 8, the material feeding device 20 according to the present embodiment is provided with the two biasing parts 90 arranged side by side in the Y direction.

As shown in FIG. 8, the shaft part 91 is inserted into a through hole Th1 penetrating the first wall 67 in the X direction, and is configured to be slidable along the through hole Th1. In the present embodiment, the first wall 67 is provided with the two through holes Th1 across the central part in the Y direction of the main body part 51, and the two shaft parts 91 are also disposed across the central part in the Y direction of the main body part 51.

An end portion at the −X direction side of the shaft part 91 is fixed to the first member 75. Thus, the first member 75 makes the sliding displacement in tandem with the sliding of the shaft part 91. It should be noted that the end portion at the −X direction side of the shaft part 91 and the first member 75 can be fixed to each other via, for example, an adhesive or a bolt, or can also be welded to each other. Further, the shaft part 91 and the first member 75 have the shapes to be engaged with each other so that the actions thereof coordinate with each other.

As shown in FIG. 6 and FIG. 8, in an end portion at the +X direction side of the shaft part 91, there is disposed a flange part 92 formed to have a flange-like shape. The flange part 92 is configured to be located at the +X direction side of the first wall 67, and a diameter of the flange part 92 is larger than an opening diameter of the through hole Th1. Therefore, the flange part 92 defines an end at the −X direction side of the slidable range of the shaft part 91, and an end at the −X direction side of a range in which the sliding displacement of the first member 75 can be made. In other words, the shaft part 91 and the first member 75 can be displaced toward the −X direction to the position where the flange part 92 makes contact with the first wall 67 from the +X direction.

It should be noted that the main body part 51 in the present embodiment is provided with a stopper 52 for defining an end at the +X direction side of the slidable range of the shaft part 91, and an end at the +X direction side of the range in which the sliding displacement of the first member 75 can be made. The stopper 52 penetrates the bottom part 60 in the Z direction, and is disposed so as to project toward the +Z direction with respect to the bottom part 60. The stopper 52 is disposed between the two shaft parts 91 in the Y direction. The shaft part 91 and the first member 75 can be displaced toward the +X direction to the position where the end surface at the +X direction side of the first member 75 makes contact with the stopper 52.

The elastic part 93 in the present embodiment is formed of a coil spring. The elastic part 93 is disposed between the first member 75 and the first wall 67, and the shaft part 91 is inserted into the elastic part 93. The biasing part 90 biases the first member 75 toward the −X direction using the elastic force of the elastic parts 93.

Figure 9:
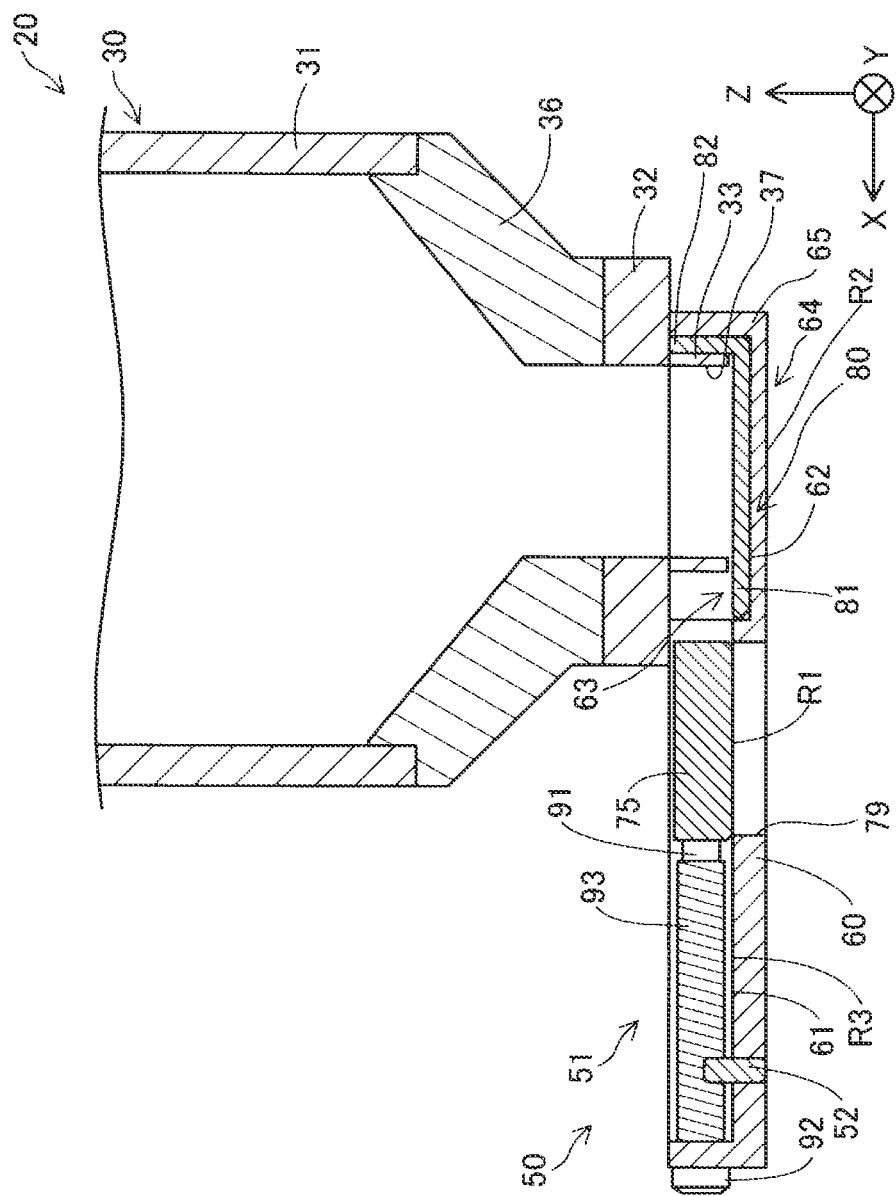
FIG. 9 is a diagram showing a cross-sectional surface of the material feeding device in a non-communicated state according to the first embodiment.
Figure 10:
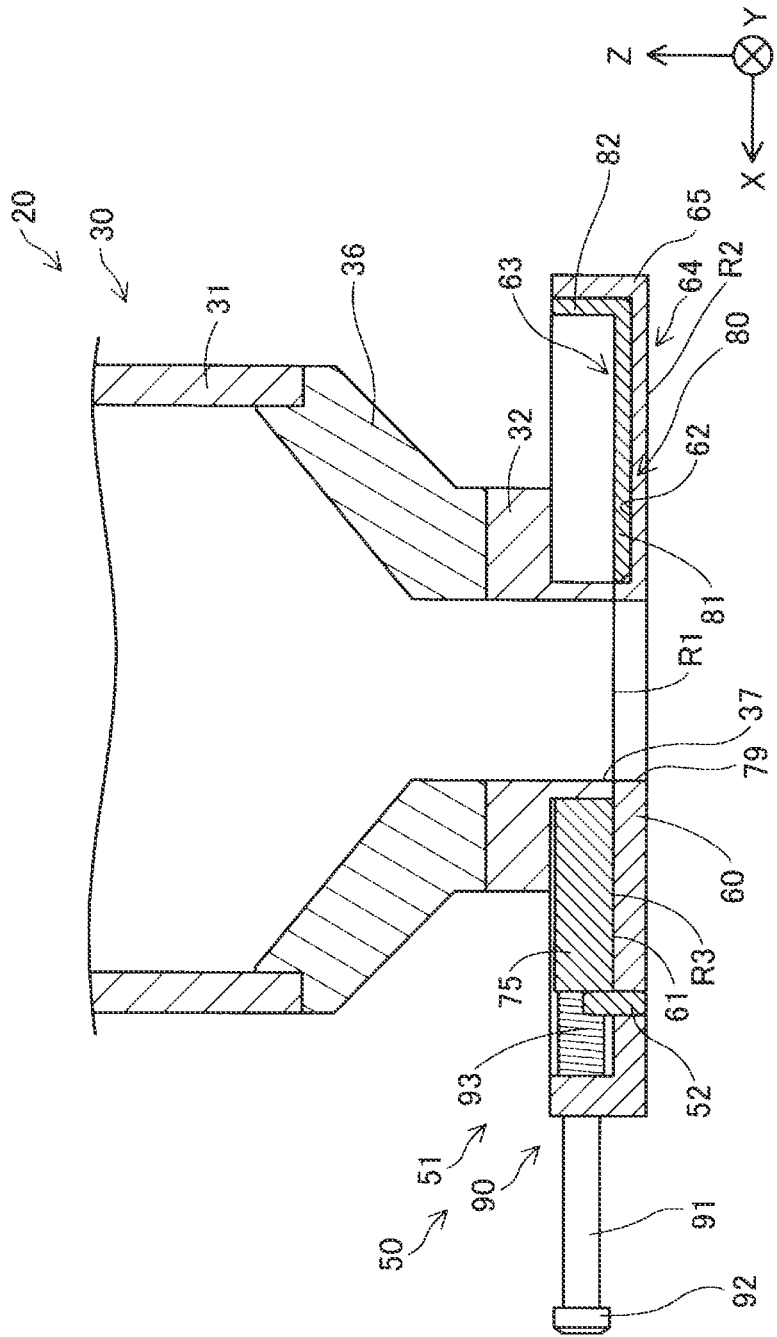
FIG. 10 is a diagram showing a cross-sectional surface of the material feeding device in a communicated state according to the first embodiment.

FIG. 9 is a diagram showing a cross-sectional surface of the material feeding device 20 in a non-communicated state. FIG. 10 is a diagram showing a cross-sectional surface of the material feeding device 20 in a communicated state. The non-communicated state means the state in which the first member 75 covers the feed hole 79 in the attached state. The communicated state means the state in which the opening part 37 and the feed hole 79 are communicated with each other in the attached state. As shown in FIG. 9 and FIG. 10, the material feeding device 20 is configured to be able to switch between the non-communicated state and the communicated state in the attached state. It should be noted that the details of the switching between the non-communicated state and the communicated state in the present embodiment will be described later.

It should be noted that when using the expression that "the first member 75 covers the feed hole 79," the first member 75 is not required to completely cover the feed hole 79, and it is sufficient for the first member 75 to cover the feed hole 79 to the extent that a foreign matter can be prevented from entering the plasticizing section 120 via the feed hole 79. For example, it is possible for the first member 75 to be formed of a member shaped like a net having a mesh in a size with which infiltration of a foreign matter can be prevented, or it is possible to open a microscopic gap when the first member 75 covers the feed hole 79. In this case, the size of the mesh or the gap can be decided as, for example, a size in which the pellet does not pass, or can be decided as a size in which entrance of a human region such as a finger can be prevented based on numerical values described in JIS B9711.

As shown in FIG. 6 and FIG. 9, the hopper 30 is configured to detachably be attached to the coupling member 50 in the detachably attaching part 64 described above. Specifically, as shown in FIG. 9, by the mouth part 32 being mounted on the detachably attaching part 64, the hopper 30 is attached to the coupling member 50. As shown in FIG. 9, in the present embodiment, when the hopper 30 is attached to the coupling member 50, the material feeding device 20 first takes the non-communicated state. Further, the hopper 30 is lifted toward the +Z direction with respect to the coupling member 50 in the detachably attaching part 64 to thereby be removed from the coupling member 50 as shown in FIG. 6.

In the present embodiment, the second member 80 is detached/attached from/to the detachably attaching part 64 due to the detachment/attachment of the hopper 30 from/to the coupling member 50. Specifically, when the hopper 30 is mounted on the detachably attaching part 64 as shown in FIG. 9, the lid part 81 of the second member 80 becomes in the state of being fitted in the first recessed part 63, and thus, the second member 80 is attached to the detachably attaching part 64. Further, by the hopper 30 being lifted toward the +Z direction with respect to the coupling member 50 in the detachably attaching part 64, the second member 80 is lifted together with the hopper 30 toward the +Z direction with respect to the coupling member 50, and is then detached from the first recessed part 63 of the detachably attaching part 64 as shown in FIG. 6.

In the present embodiment, in the attached state, the opening part 37 of the hopper 30 is configured to be able to move between the second area R2 and the first area R1. Specifically, first, by the hopper 30 and the second member 80 being mounted on the detachably attaching part 64 in the second area R2, the upper surface of the lid part 81 and the slide surface 61 are located at the same height as shown in FIG. 9, and thus, the upper surface of the lid part 81 and the slide surface 61 are substantially continued. On this occasion, since the first engagement part 34 of the hopper 30 and the third engagement part 59 of the coupling member 50 shown in FIG. 8 are configured to be able to engage with each other, by the hopper 30 moving toward the +X direction from the second area R2 toward the first area R1, the first engagement part 34 and the third engagement part 59 engage with each other while the engagement between the first engagement part 34 and the second engagement part 83 is released, and the opening part 37 makes the sliding displacement from above the lid part 81 to above the slide surface 61. Further, by the hopper 30 moving on the slide surface 61 in the +X direction toward the first area R1, the opening part 37 makes the sliding displacement on the slide surface 61 in the +X direction. It should be noted that the sliding displacement of the opening part 37 from the second area R2 to the first area R1 is referred to as a first displacement in some cases.

By the hopper 30 being displaced in the −X direction from the first area R1 toward the second area R2, the opening part 37 makes the sliding displacement on the slide surface 61 in the −X direction. Further, by the hopper 30 being displaced in the −X direction until the hopper 30 is located in the second area R2, the first engagement part 34 and the second engagement part 83 engage with each other while the engagement between the first engagement part 34 and the third engagement part 59 is released, and the opening part 37 makes the sliding displacement from above the slide surface 61 to above the lid part 81 located at the detachably attaching part 64 in the second area R2. The sliding displacement of the opening part 37 from the first area R1 to the second area R2 is referred to as a second displacement in some cases.

It should be noted that the second member 80 does not move in the first displacement or the second displacement, but is left at the detachably attaching part 64 in the second area R2 while keeping the state of being fitted in the first recessed part 63. In other words, in the attached state, the second member 80 is located in the second area R2. Since the lid part 81 of the second member 80 covers the opening part 37 in the second area R2, scattering of the material due to the detachment/attachment of the hopper 30 from/to the coupling member 50 is prevented. Further, in the present embodiment, in the attached state, since the second member 80 is located in the second area R2 below the opening part 37, specifically, so that the upper surface of the lid part 81 and the slide surface 61 are located at the same height as described above, the material in the hopper 30 is prevented from scattering via the opening part 37 when the opening part 37 moves between above the lid part 81 and above the slide surface 61, and thus, a loss of the material is prevented.

As shown in FIG. 9, the material feeding device 20 is configured to be able to take the non-communicated state by the first member 75 making the sliding displacement to the first area R1 when the hopper 30 is located in the second area R2. Further, as shown in FIG. 10, the material feeding device 20 is configured to be able to take the communicated state by the first member 75 making the sliding displacement to the third area R3 when the hopper 30 is located in the first area R1. The third area R3 is an area different from the first area R1 on the slide surface 61. As shown in FIG. 10, in the present embodiment, the third area R3 is located at an opposite side to the second area R2 with respect to the first area R1, and specifically, located at the +X direction side of the first area R1.

The material feeding device 20 according to the present embodiment makes the transition from the non-communicated state to the communicated state due to the first displacement and the sliding displacement of the first member 75 coordinating with the first displacement, and thus, takes the communicated state. As shown in FIG. 9 and FIG. 10, the first member 75 in the present embodiment makes the sliding displacement from the third area R3 to the first area R1 in tandem with the first displacement. More specifically, in the first displacement, the first member 75 is pushed by the coupling part 33 toward the +X direction to thereby make the sliding displacement from the first area R1 to the third area R3. Thus, the opening part 37 moves to the first area R1 to be located above the feed hole 79, and at the same time, the first member 75 makes the transition from the state of covering the feed hole 79 to the state of not covering the feed hole 79, and thus, the material feeding device 20 takes the communicated state. By the material feeding device 20 taking the communicated state, the material in the hopper 30 is fed to the plasticizing section 120 via the opening part 37 and the feed hole 79.

Further, the material feeding device 20 according to the present embodiment makes the transition from the communicated state to the non-communicated state due to the second displacement and the sliding displacement of the first member 75 coordinating with the second displacement, and thus, takes the non-communicated state. As shown in FIG. 9 and FIG. 10, the first member 75 in the present embodiment makes the sliding displacement from the first area R1 to the third area R3 in tandem with the second displacement. More specifically, in the second displacement, the first member 75 is biased by the basing parts 90 toward the −X direction to thereby make the sliding displacement from the third area R3 to the first area R1 following the displacement toward the −X direction of the coupling part 33. Thus, the opening part 37 becomes to fail to overlap the feed hole 79, and at the same time, the first member 75 makes the transition from the state of not covering the feed hole 79 to the state of covering the feed hole 79, and thus, the material feeding device 20 takes the non-communicated state.

It should be noted that as shown in FIG. 5 and FIG. 8, the main body part 51 in the present embodiment is provided with a first lock pin 53 for fixing the hopper 30 in the communicated state. As shown in FIG. 8, the first lock pin 53 is disposed so as to penetrate the second wall 68 in the Y direction. Further, on a side surface at the −Y direction side of the coupling part 33 of the hopper 30, there is disposed a recess which is not shown and in which the tip in the +Y direction of the first lock pin 53 is fitted. It is possible for the user to press the first lock pin 53 in the +Y direction into the main body part 51 to thereby engage the first lock pin 53 and the coupling part 33 with each other to thereby fix the hopper 30 so as to be located in the first area R1 in the communicated state.

Further, as shown in FIG. 5 and FIG. 8, the main body part 51 is provided with a second lock pin 54 for fixing the second member 80 in the attached state. As shown in FIG. 8, the second lock pin 54 is disposed so as to penetrate the fifth wall 72 in the +Y direction. Further, on a surface at the −Y direction side of the wall part 82 of the second member 80, there is disposed a recess which is not shown and in which the tip in the +Y direction of the second lock pin 54 is fitted. It is possible for the user to press the second lock pin 54 in the +Y direction into the main body part 51 to thereby engage the second lock pin 54 and the wall part 82 with each other to thereby fix the second member 80 so as to be located in the second area R2 in the attached state. It should be noted that the second lock pin 54 does not limit the displacement of the hopper 30 and the opening part 37.

According to the material feeding device 20 described hereinabove, there is adopted the configuration in which it is possible to take the communicated state when the hopper 30 is located in the first area R1, and to take the non-communicated state when the hopper 30 is located in the second area R2, and the non-communicated state is taken at least when the hopper 30 is detached from the coupling member 50 via the detachably attaching part 64. Therefore, when the hopper 30 is detached from the coupling member 50 or the hopper 30 is in the detached state, the possibility that a foreign matter enters the plasticizing section 120 via the feed hole 79 decreases.

Further, in the present embodiment, the material feeding device 20 takes the communicated state by the first member 75 moving from the first area R1 to the third area R3 in tandem with the first displacement, and takes the non-communicated state by the first member 75 moving from the third area R3 to the first area R1 in tandem with the second displacement. Therefore, the sliding displacement of the opening part 37 and the sliding displacement of the first member 75 coordinate with each other, and the possibility that a foreign matter enters the plasticizing section 120 via the feed hole 79 decreases even in the transition between the communicated state and the non-communicated state.

Further, in the present embodiment, the material feeding device 20 is provided with the second member 80 which has the lid part 81 for covering the opening part 37 in the second area R2, and is located in the second area R2 in the attached state. Thus, it is possible to easily take the communicated state due to the first displacement even when the second member 80 is disposed, and at the same time, by locating the opening part 37 in the second area R2 by the second displacement, it is possible to easily cover the opening part 37 with the second member 80. Therefore, it is possible to decrease the possibility that a foreign matter enters the plasticizing section 120 via the feed hole 79, and at the same time, it is possible to decrease the possibility that the material in the hopper 30 scatters via the opening part 37 by a simple operation.

Further, in the present embodiment, in the attached state, the upper surface of the lid part 81 of the second member 80 is located at the same height as the slide surface 61. Therefore, by the simple operation, it is possible to decrease the possibility that a foreign matter enters the plasticizing section 120 via the feed hole 79, and at the same time, the scattering of the material when the opening part 37 moves between above the lid part 81 and above the slide surface 61 is suppressed, and thus, the loss of the material is suppressed.

Further, in the present embodiment, the first engagement part 34 of the hopper 30 and the second engagement part 83 of the second member 80 are configured so that the engagement therebetween is released due to the first displacement, and the engagement therebetween is achieved due to the second displacement. Therefore, it is possible to prevent separation of the second member 80 from the hopper 30 when the hopper 30 is detached from the coupling member 50 or in the detached state, and further, it is possible to separate the second member 80 from the hopper 30 to open the opening part 37 by the simple operation in the attached state.

B. Second Embodiment

Figure 11:
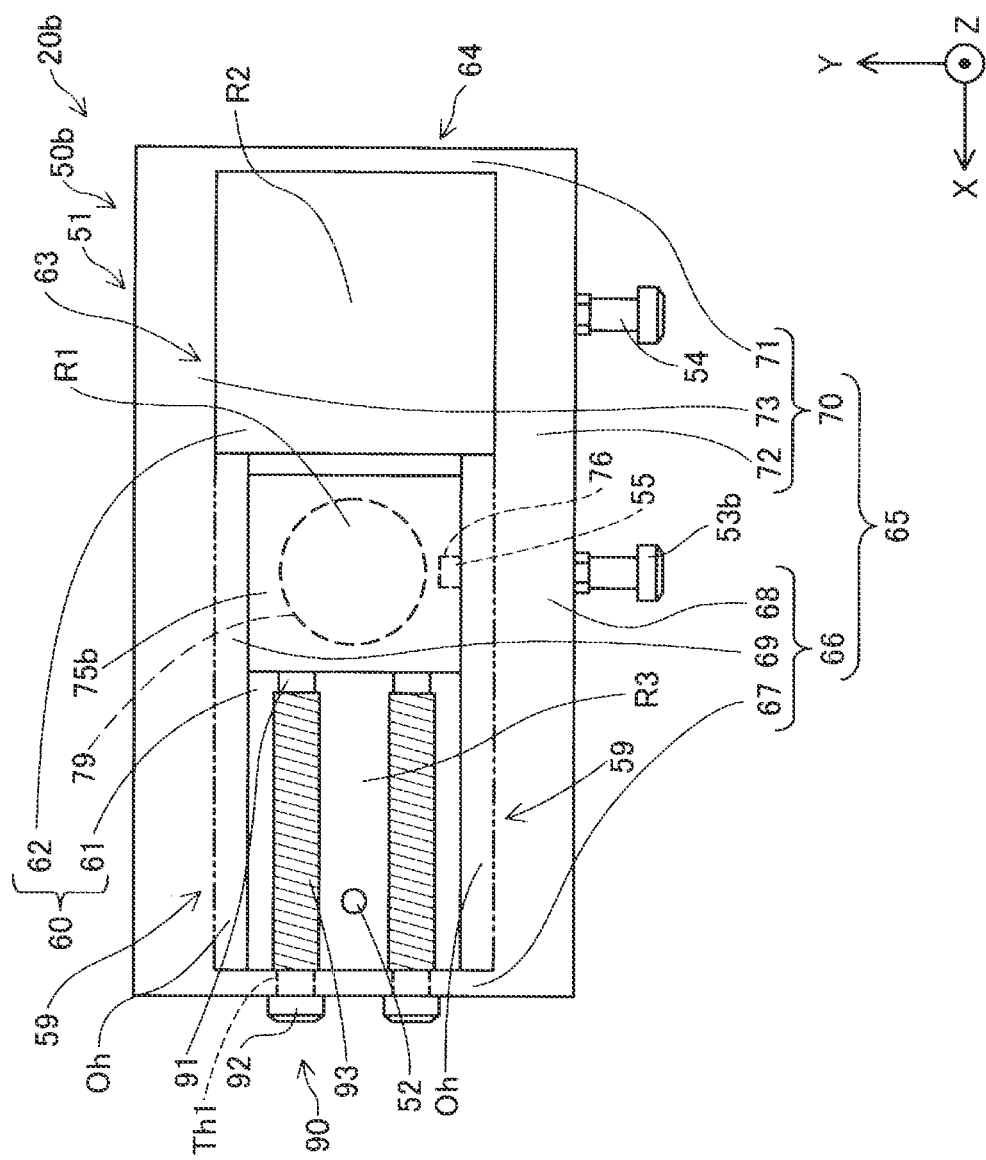
FIG. 11 is a plane view of a coupling member in a second embodiment.

FIG. 11 is a plane view of a coupling member 50b of a material feeding device 20b according to a second embodiment. The material feeding device 20b according to the present embodiment is provided with a regulatory part unlike the first embodiment. The regulatory part means a member configured to be able to regulate the sliding displacement of a first member 75b in the non-communicated state. Specifically, in the present embodiment, a first lock pin 53b functions as the regulatory part. It should be noted that in the configuration of the material feeding device 20b and the injection molding device 100 according to the second embodiment, a portion not particularly described is substantially the same as in the first embodiment.

On a side surface at the −Y direction side of the first member 75b in the present embodiment, there is disposed a fitting part 76 as a recess in which a tip portion 55 in the +Y direction of the first lock pin 53b is fitted. In the non-communicated state, by the first lock pin 53b being pressed in the +Y direction into the main body part 51, the tip portion 55 is fitted in the fitting part 76, and thus, the sliding displacement of the first member 75b is regulated. In other words, the first member 75b is fixed to the first area R1 with the first lock pin 53b which functions as the regulatory part. It should be noted that the operation of the first lock pin 53b can be performed by, for example, the user, or can also be performed by a mechanism or the like for driving the first lock pin 53b. Further, in another embodiment, the first lock pin 53b is not required to function as the regulatory part, and for example, the regulatory part can be another fixation member, a stopper, or the like configured to be able to regulate the sliding displacement of the first member 75b in the non-communicated state.

According also to the material feeding device 20b related to the second embodiment described hereinabove, when the hopper 30 is detached from the coupling member 50b or the hopper 30 is in the detached state, the possibility that a foreign matter enters the plasticizing section 120 via the feed hole 79 decreases. In particular, in the present embodiment, the first lock pin 53b functions as the regulatory part configured to be able to regulate the sliding displacement of the first member 75b in the non-communicated state. Therefore, due to the first lock pin 53b, it is possible to reduce the possibility that the first member 75b makes the sliding displacement from the first area R1 to other areas despite the intention in the non-communicated state, and thus, it is possible to further reduce the possibility that a foreign matter enters the plasticizing section 120 via the feed hole 79.

C. Third Embodiment

Figure 12:
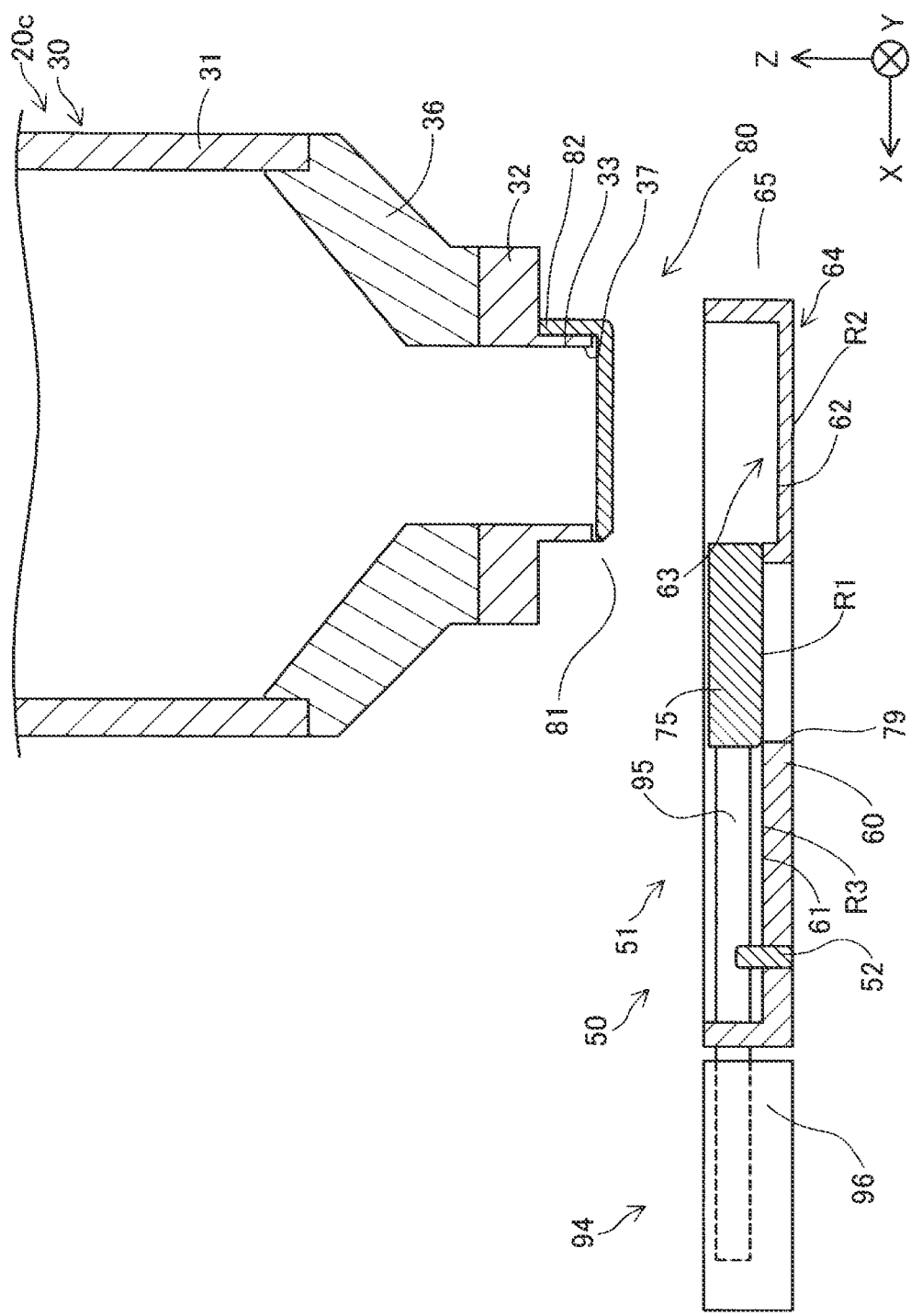
FIG. 12 is a diagram showing a cross-sectional surface of a material feeding device in the detached state according to a third embodiment.

FIG. 12 is a diagram showing a cross-sectional surface of a material feeding device 20c in the detached state according to a third embodiment. The material feeding device 20c according to the present embodiment is not provided with the biasing part 90, but is provided with a slide mechanism section 94 unlike the first embodiment. The slide mechanism section 94 is a member for making the first member 75 make the sliding displacement. It should be noted that in the configuration of the material feeding device 20c and the injection molding device 100 according to the third embodiment, a portion not particularly described is substantially the same as in the first embodiment.

The slide mechanism section 94 according to the present embodiment has a slider shaft 95, and a drive section 96 for moving the slider shaft 95. It should be noted that the configuration of the slider shaft 95 is substantially the same as the configuration of the shaft part 91 of the biasing part 90 in the first embodiment except the fact that the flange part 92 is not provided, and the fact that the slider shaft 95 is not inserted into the elastic part 93, and therefore, the description thereof will be omitted.

The drive section 96 is disposed at the +X direction side of the main body part 51. In the present embodiment, the drive section 96 is constituted by a motor driven under the control by the control section 500, and a rack-and-pinion mechanism for converting a rotation of the motor into a displacement in a translational direction along the axial direction of the slider shaft 95. The drive section 96 can be formed of, for example, a ball screw for converting the rotation of the motor into a displacement in the translational direction along the axial direction of the slider shaft 95, or can also be formed of an actuator such as a solenoid mechanism or a piezoelectric element.

The control section 500 in the present embodiment functions as a slide control section for controlling the slide mechanism section 94 to make the first member 75 make the sliding displacement. Specifically, in the present embodiment, the control section 500 controls the drive section 96 to displace the slider shaft 95 to thereby make the first member 75 make the sliding displacement from the third area R3 to the first area R1. The first member 75 makes the sliding displacement from the third area R3 to the first area R1 due to the slide mechanism section 94 to thereby push the coupling part 33 of the hopper 30 toward the −X direction, and thus, makes the opening part 37 make the sliding displacement from the first area R1 to the second area R2. Therefore, in the present embodiment, there is adopted a configuration in which the second displacement can be achieved by the displacement of the first member 75 due to the control section 500 and the slide mechanism section 94. It should be noted that in the first displacement, the first member 75 is pushed by the coupling part 33 toward the +X direction to thereby make the sliding displacement from the first area R1 to the third area R3 similarly to the first embodiment.

It should be noted that it is possible for the control section 500 to be configured to be able to operate the first lock pin 53 and the second lock pin 54 by driving, for example, the drive section 96 or other drive devices.

According also to the material feeding device 20c related to the third embodiment described hereinabove, when the hopper 30 is detached from the coupling member 50 or the hopper 30 is in the detached state, the possibility that a foreign matter enters the plasticizing section 120 via the feed hole 79 decreases. In particular, in the present embodiment, the first member 75 makes the sliding displacement from the third area R3 to the first area R1 due to the slide mechanism section 94 to thereby make the opening part 37 make the sliding displacement from the first area R1 to the second area R2. Thus, it is possible to make the transition of the material feeding device 20c from the communicated state to the non-communicated state by operating the slide mechanism section 94, and even in the transition from the communicated state to the non-communicated state, the possibility that a foreign matter enters the plasticizing section 120 via the feed hole 79 decreases.

Further, in the present embodiment, the control section 500 functions as the slide control section for controlling the slide mechanism section 94 to make the first member 75 make the sliding displacement. Therefore, by the control section 500 controlling the slide mechanism section 94, it is possible to make the transition of the material feeding device 20c from the communicated state to the non-communicated state.

It should be noted that in another embodiment, there can be adopted a configuration in which, for example, the first displacement can be achieved by the displacement of the first member 75 due to the slide mechanism section 94. Further, it is possible to dispose other mechanisms for making the first member 75 make the sliding displacement from the first area R1 to the third area R3. Further, in this case, it is possible to adopt a configuration in which the second displacement can be achieved by the slide control section controlling the slide mechanism section 94 and other mechanisms to thereby make the first member 75 make the sliding displacement.

D. Fourth Embodiment

Figure 13:
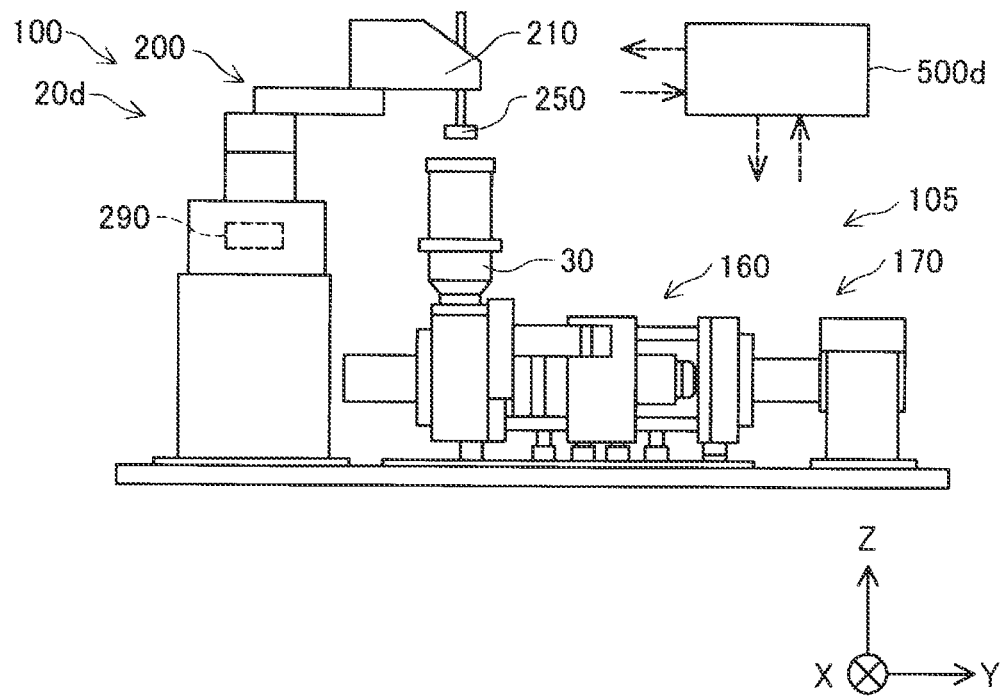
FIG. 13 is a diagram showing a schematic configuration of an injection molding device according to a fourth embodiment.

FIG. 13 is a diagram showing a schematic configuration of an injection molding device 100 according to a fourth embodiment. As shown in FIG. 13, a material feeding device 20d according to the present embodiment is provided with a robot 200 unlike the first embodiment. It should be noted that in the configuration of the material feeding device 20d and the injection molding device 100 according to the fourth embodiment, a portion not particularly described is substantially the same as in the first embodiment.

The robot 200 is a device for moving the hopper 30 to thereby make the opening part 37 shown in FIG. 6 make the sliding displacement between the first area R1 and the second area R2. The robot 200 according to the present embodiment is configured as a horizontal articulated robot provided with an arm part 210, a sucking section 250 provided to the arm part 210, and a robot control section 290. The robot 200 moves the sucking section 250 with the arm part 210, and makes vacuum contact with the hopper 30 to thereby hold the hopper 30 with the sucking section 250. The robot control section 290 is formed of a computer provided with at least one processor, a main storage device, and an input/output interface for performing input/output of a signal from/to the outside. In the present embodiment, the robot control section 290 controls the arm part 210 and the sucking section 250 by the processor executing a program or instructions retrieved on the main storage device. It should be noted that the robot 200 is not limited to the horizontal articulated robot, and can be formed of another robot such as a vertical articulated robot having a plurality of axes.

A control section 500d in the present embodiment is configured to control operations of the arm part 210 and the sucking section 250 of the robot 200 via the robot control section 290. The control section 500d controls the robot 200 via the robot control section 290 to operate the arm part 210 in the state of holding the hopper 30 with the sucking section 250, then mount the hopper 30 on the detachably attaching part 64 in the second area R2 shown in FIG. 8 to attach the hopper 30 to the coupling member 50. Further, in the attached state, the control section 500*d* moves the hopper 30 from the second area R2 to the first area R1 in the state in which the hopper 30 is held by the sucking section 250. Similarly, the control section 500*d* is capable of moving the hopper 30 from the first area R1 to the second area R2 in the state in which the hopper 30 is held by the sucking section 250, and is capable of detaching the hopper 30 from the coupling member 50 by lifting the hopper 30 with respect to the coupling member 50. As described above, the robot 200 moves the hopper 30 to thereby make the opening part 37 of the hopper 30 make the sliding displacement between the first area R1 and the second area R2. It should be noted that the first member 75 in the present embodiment makes the sliding displacement in tandem with the displacement of the opening part 37 similarly to the first embodiment.

According also to the material feeding device 20*d* related to the fourth embodiment described hereinabove, when the hopper 30 is detached from the coupling member 50 or the hopper 30 is in the detached state, the possibility that a foreign matter enters the plasticizing section 120 via the feed hole 79 decreases. In particular, in the present embodiment, there is provided the robot 200 which moves the hopper 30 to thereby make the opening part 37 make the sliding displacement between the first area R1 and the second area R2. Therefore, it is possible for the robot 200 to move the hopper 30 to thereby make the opening part 37 make the sliding displacement to switch between the communicated state and the non-communicated state of the material feeding device 20*d*.

It should be noted that it is possible for the robot 200 to be configured so as not to perform the detachment/attachment of the hopper 30 from/to the coupling member 50, but to perform only the displacement of the hopper 30. Further, it is possible for the robot 200 to be configured to be able to perform other operations than the operation related to the material feeding device 20*d*. For example, when the material feeding device 20*d* is provided to the injection molding device 100 as in the present embodiment, the robot 200 can be configured to be able to take out or convey the molded objects molded by the injection molding device 100.

E. Fifth Embodiment

Figure 14:
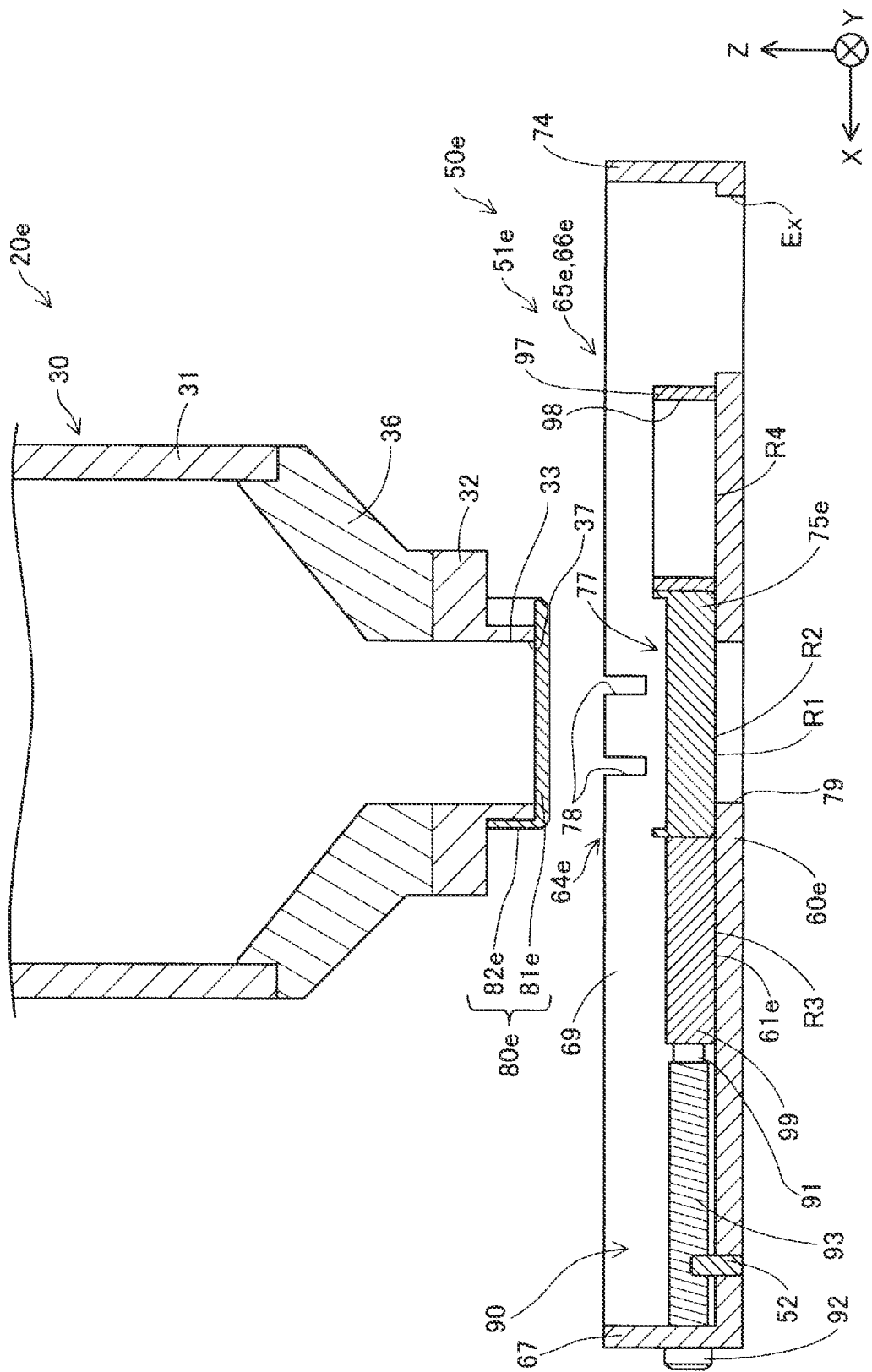
FIG. 14 is a diagram showing a cross-sectional surface of a material feeding device in the detached state according to a fifth embodiment.

FIG. 14 is a diagram showing a cross-sectional surface of a material feeding device 20*e* in the detached state according to a fifth embodiment. A coupling member 50*e* in the present embodiment has a third member 97 unlike the first embodiment. It should be noted that in the configuration of the material feeding device 20*e* and the injection molding device 100 according to the fifth embodiment, a portion not particularly described is substantially the same as in the first embodiment.

Unlike the first embodiment, a bottom part 60*e* of a main body part 51*e* in the present embodiment does not have the detachably attaching surface 62, but has a slide surface 61*e*. The slide surface 61*e* in the present embodiment is provided with a discharge port Ex in addition to the feed hole 79. In the present embodiment, the discharge port Ex is disposed at the −X direction side of the feed hole 79. The discharge port Ex is communicated with a container or the like not shown.

The third member 97 in the present embodiment has a substantially quadrangular prismatic outer shape which is flat in the X direction and the Y direction. The third member 97 is disposed on the slide surface 61*e*, and is configured to be able to make a sliding displacement on the slide surface 61*e*. The third member 97 is provided with a coupling hole 98. The coupling hole 98 in the present embodiment is a hole penetrating the third member 97 along the Z direction, and has a substantially circular shape when viewed along the Z direction. The third member 97 is capable of communicating the coupling hole 98 and the feed hole 79 with each other by being located in the first area R1. Further, as shown in FIG. 14, the third member 97 is located in a fourth area R4 in the detached state. The fourth area R4 is an area on the slide surface 61, and is an area different from the first area R1. Specifically, the fourth area R4 in the present embodiment is located between the feed hole 79 and the discharge port Ex when viewed along the Z direction. The sliding displacement of the third member 97 from the fourth area R4 to the first area R1 is referred to as a third displacement in some cases. The sliding displacement of the third member 97 from the first area R1 to the fourth area R4 is referred to as a fourth displacement in some cases.

A first member 75*e* in the present embodiment is configured to be able to make the sliding displacement in tandem with the third member 97. The first member 75*e* is fixed to a surface at the +X direction side of the third member 97. Further, to the surface at the +X direction side of the first member 75*e*, there is fixed a fourth member 99. The fourth member 99 is a member which has a substantially quadrangular prismatic shape flat in the X direction and the Y direction, which is disposed on the slide surface 61*e*, and which is configured to be able to make a sliding displacement on the slide surface 61*e*. Further, to the surface at the +X direction side of the fourth member 99, there is fixed the end portion at the −X direction side of the shaft part 91. Therefore, in the present embodiment, the first member 75*e*, the third member 97, and the fourth member 99 make the sliding displacement in tandem with the slide of the shaft part 91. It should be noted that the members described above can be fixed via an adhesive, a volt, or the like to each other, can be welded to each other, or can be provided with shapes engaged with each other so that the actions thereof coordinate with each other.

The third member 97 described above can be located above the discharge port Ex by making the sliding displacement toward the −X direction from the fourth area R4 in the detached state. Thus, it is possible to remove the material in the coupling hole 98 to a container or the like communicated with the discharge port Ex via the discharge port Ex. When the third member 97 is located above the discharge port Ex, the fourth member 99 is located in the fourth area R4, and the feed hole 79 is covered with the fourth member 99. It should be noted that in another embodiment, the discharge port Ex and the fourth member 99 are not required to be provided. When the fourth member 99 is not provided, the end portion at the −X direction side of the shaft part 91 is, for example, fixed to the side surface at the +X direction side of the first member 75*e* similarly to the first embodiment.

The first member 75*e* in the present embodiment is provided with a second recessed part 77 unlike the first embodiment. The second recessed part 77 is a portion recessed toward the −Z direction in the surface at the +Z direction side of the first member 75*e*. It should be noted that there is adopted a configuration in which the dimension of the second recessed part 77 coincides with the dimension of the lid part 81 of a second member 80*e* similarly to the first recessed part 63 in the first embodiment.

Unlike the first embodiment, a sidewall part 65*e* in the present embodiment does not have the second sidewall part 70, but has a first sidewall part 66*e* surrounding the slide surface 61*e*. The first sidewall part 66*e* in the present embodiment has a seventh wall 74 located at the −X direction side of the slide surface 61e in addition to the first wall 67 through the third wall 69. Therefore, unlike the first embodiment, the slide surface 61e in the present embodiment is surrounded on four sides in the X direction and the Y direction by the first sidewall part 66e when viewed along the Z direction. It should be noted that the second wall 68 is omitted in FIG. 14 for the sake of convenience of illustration.

In the present embodiment, the second area R2 is located on the first area R1. In other words, a detachably attaching part 64e in the present embodiment is disposed above the first area R1. As described above, unlike the first embodiment, in the present embodiment, the detachably attaching surface 62 is not provided, and the detachably attaching part 64e is formed of the sidewall part 65e. In the present embodiment, groove parts 78 are provided to the second wall 68 and the third wall 69 as a part of the detachably attaching part 64e. The hopper 30 is attached to a coupling member 50e so that protrusions not shown provided to the mouth part 32 fit in the groove parts 78. The groove parts 78 regulate the displacement along the X direction and the Y direction of the hopper 30 in the attached state.

The second member 80e in the present embodiment has the lid part 81 and a wall part 82e similarly to the first embodiment. The wall part 82e in the present embodiment is formed so as to surround the +X direction side, the +Y direction side, and the −Y direction side of the mouth part 32 in the detached state. Further, the first engagement part 34 provided to the hopper 30 in the present embodiment is configured to be able to engage with the second engagement part 83 provided to the second member 80e from the −X direction side of the second engagement part 83.

The second member 80e is configured to be able to be detached/attached from/to the first member 75e due to the detachment/attachment of the hopper 30 from/to the coupling member 50e via the detachably attaching part 64e. Specifically, the second member 80e is configured to be able to detachably be attached to the second recessed part 77 provided to the first member 75e.

Figure 15:
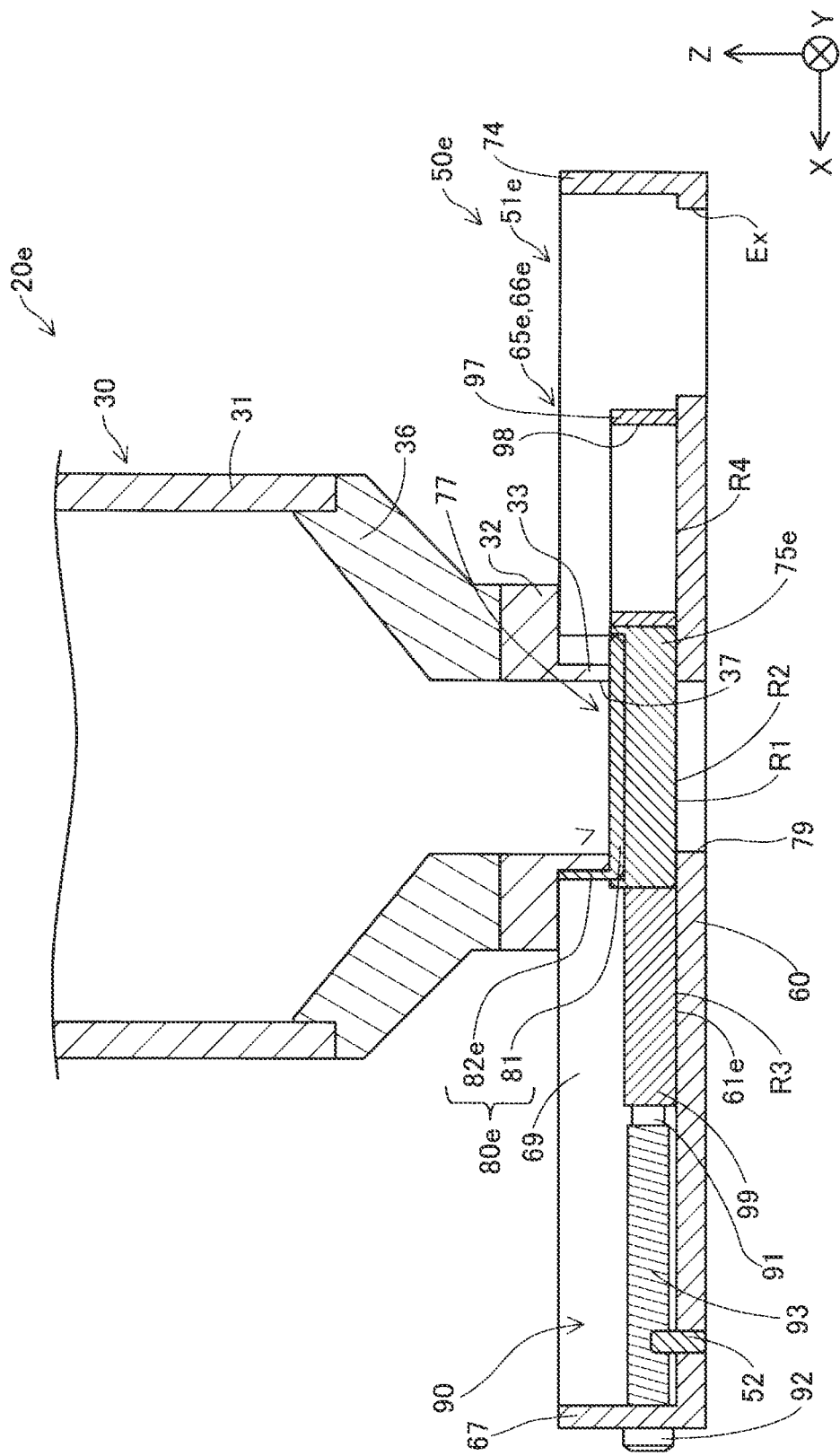
FIG. 15 is a diagram showing a cross-sectional surface of the material feeding device in the non-communicated state according to the fifth embodiment.

FIG. 15 is a diagram showing a cross-sectional surface of the material feeding device 20e in the non-communicated state. As shown in FIG. 15, due to the attachment of the hopper 30 to the coupling member 50e, the second member 80e is stacked on the first member 75e located in the first area R1 so as to fit in the second recessed part 77, and is thus attached to the first member 75e. The second member 80e is configured to be able to move along the X direction in tandem with the sliding displacement of the first member 75e in the attached state by being attached to the first member 75e. In the present embodiment, the second member 80e moves in tandem with the sliding displacement of the first member 75e while keeping the state of being fitted in the second recessed part 77 in the attached state. Further, due to the separation of the hopper 30 from the coupling member 50e, the second member 80e is lifted upward with respect to the first member 75e to be detached from the first member 75e.

Figure 16:
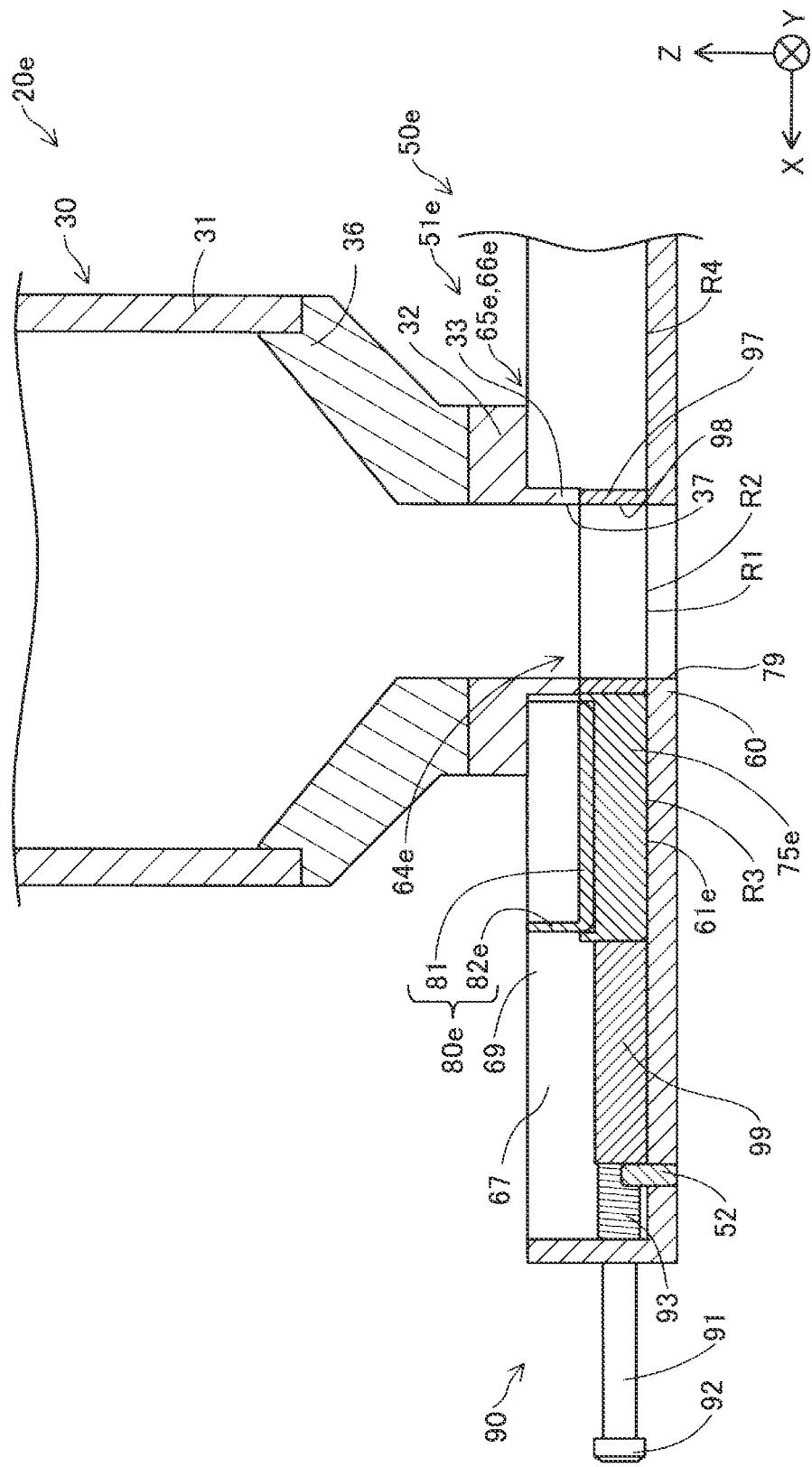
FIG. 16 is a diagram showing a cross-sectional surface of the material feeding device in the communicated state according to the fifth embodiment.

FIG. 16 is a diagram showing a cross-sectional surface of the material feeding device 20e in the communicated state. The material feeding device 20e according to the present embodiment makes the transition from the non-communicated state to the communicated state due to the third displacement and the sliding displacement of the first member 75e coordinating with the third displacement, and thus, takes the communicated state. Specifically, as shown in FIG. 15, by the hopper 30 being attached to the coupling member 50e via the detachably attaching part 64e in the second area R2 located on the first area R1, the upper surface of the lid part 81 and the upper surface of the third member 97 are located at the same height, and the upper surfaces of the lid part 81 and the third member 97 are substantially continued to each other. Then, as shown in FIG. 16, due to the third displacement in which the third member 97 is displaced from the fourth area R4 to the first area R1, the first member 75e is displaced from the first area R1 to the third area R3. More specifically, in the third displacement, the first member 75e is pushed by the third member 97 toward the +X direction to thereby make the sliding displacement from the first area R1 to the third area R3. On this occasion, the second member 80e is displaced from the first area R1 to the third area R3 in tandem with the first member 75e, and the engagement between the first engagement part 34 of the hopper 30 and the second engagement part 83 of the second member 80e is released. Thus, the feed hole 79 and the opening part 37 are opened, and at the same time, the opening part 37 and the feed hole 79 are communicated with each other via the coupling hole 98 provided to the third member 97, and the material feeding device 20e takes the communicated state. It should be noted that the third area R3 in the present embodiment is located at an opposite side to the fourth area R4 with respect to the first area R1, and specifically, located at the +X direction side of the first area R1.

The material feeding device 20e according to the present embodiment makes the transition from the communicated state to the non-communicated state due to the fourth displacement and the sliding displacement of the first member 75e coordinating with the fourth displacement, and thus, takes the non-communicated state. As shown in FIG. 15 and FIG. 16, the first member 75e makes the sliding displacement from the third area R3 to the first area R1 in tandem with the fourth displacement. More specifically, in the fourth displacement, the first member 75e is biased by the basing parts 90 toward the −X direction to thereby make the sliding displacement from the third area R3 to the first area R1 following the displacement toward the −X direction of the third member 97. The second member 80e is displaced from the third area R3 to the first area R1 in tandem with the sliding displacement of the first member 75e, and thus, the first engagement part 34 and the second engagement part 83 are engaged with each other. Thus, the second member 80e covers the opening part 37 in the second area R2 on the first area R1, and at the same time, the first member 75e makes the transition from the state of not covering the feed hole 79 to the state of covering the feed hole 79, and the material feeding device 20e takes the non-communicated state.

According also to the material feeding device 20e related to the fifth embodiment described hereinabove, when the hopper 30 is detached from the coupling member 50e or the hopper 30 is in the detached state, the possibility that a foreign matter enters the plasticizing section 120 via the feed hole 79 decreases. In particular, in the present embodiment, the first member 75e makes the sliding displacement from the first area R1 to the third area R3 in tandem with the third displacement, and makes the sliding displacement from the third area R3 to the first area R1 in tandem with the fourth displacement. Therefore, the sliding displacement of the third member 97 and the sliding displacement of the first member 75e coordinate with each other, and the possibility that a foreign matter enters the plasticizing section 120 via the feed hole 79 decreases even in the transition between the communicated state and the non-communicated state.

Further, in the present embodiment, the material feeding device 20e is provided with the second member 80e which is configured to be detached/attached from/to the first member 75*e* due to the detachment/attachment of the hopper 30 from/to the coupling member 50*e* via the detachably attaching part 64*e*, and which covers the opening part 37 in the second area R2, and the second member 80*e* is configured to be able to be displaced in tandem with the sliding displacement of the first member 75*e*. Thus, it is possible to easily take the communicated state due to the third displacement even when the second member 80*e* is disposed, and at the same time, it is possible to easily cover the opening part 37 with the second member 80*e* by the fourth displacement. Therefore, it is possible to decrease the possibility that a foreign matter enters the plasticizing section 120 via the feed hole 79, and at the same time, it is possible to decrease the possibility that the material in the hopper 30 scatters via the opening part 37 by a simple operation.

Further, in the present embodiment, the first engagement part 34 of the hopper 30 and the second engagement part 83 of the second member 80*e* are configured so that the engagement therebetween is released due to the third displacement, and the engagement therebetween is achieved due to the fourth displacement. Therefore, it is possible to prevent the separation of the second member 80*e* from the hopper 30 in the detached state or when the hopper 30 is separated from the coupling member 50*e*, and further, it is possible to separate the second member 80*e* from the hopper 30 to open the opening part 37 by the simple operation in the attached state.

It should be noted that in the fifth embodiment, it is sufficient for the sliding displacement of the first member 75*e* and the sliding displacement of the third member 97 to coordinate with each other, and for example, it is possible to adopt a configuration in which the third member 97 makes the sliding displacement so as to follow the sliding displacement of the first member 75*e*. Further, for example, it is possible to adopt a configuration in which the first member 75*e* and the third member 97 make the sliding displacement due to the drive mechanism, the robot, or the like for making the first member 75*e* and the third member 97 make the sliding displacement.

F. Sixth Embodiment

Figure 17:
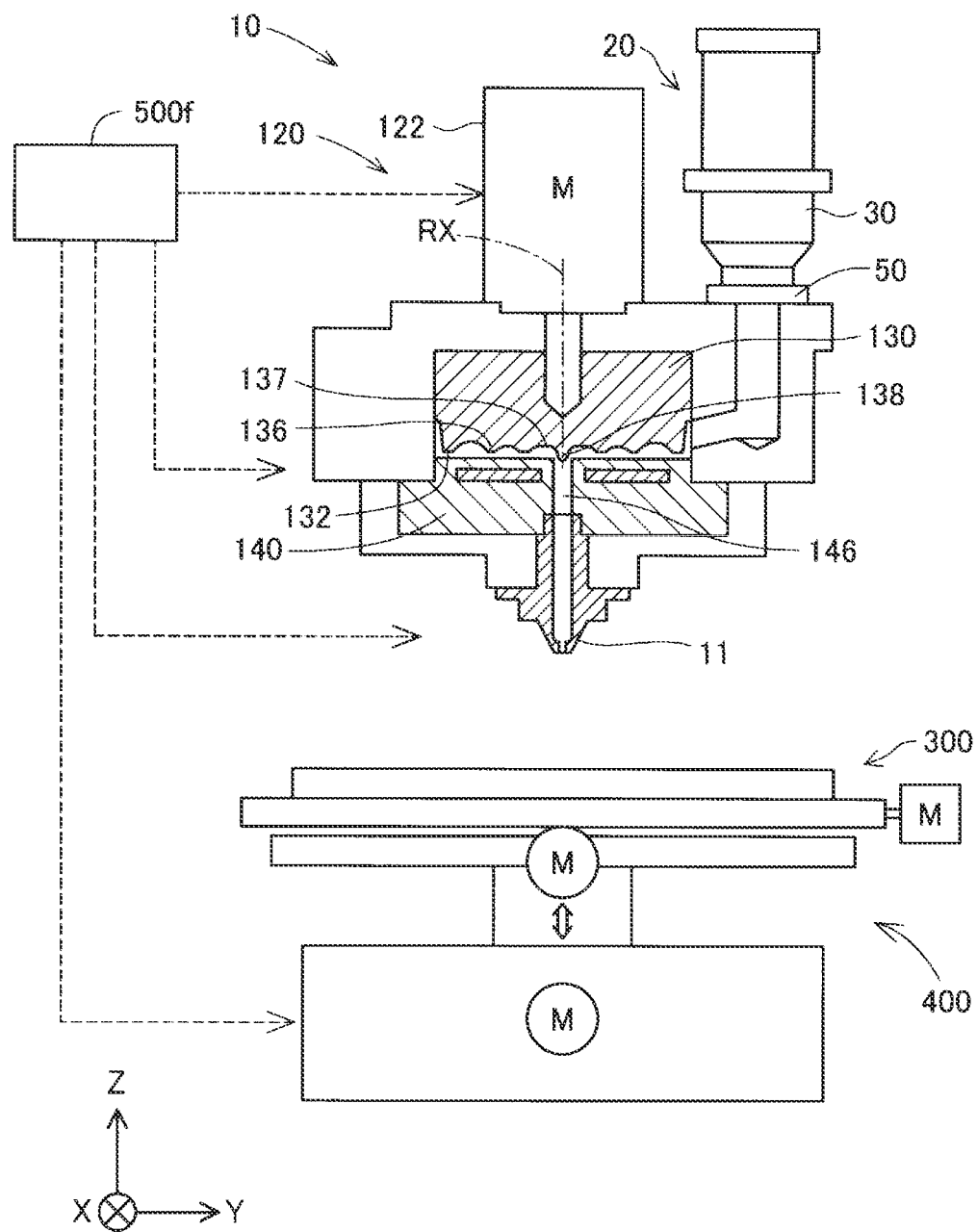
FIG. 17 is a diagram showing a schematic configuration of a three-dimensional modeling device as a sixth embodiment.

FIG. 17 is a diagram showing a schematic configuration of a three-dimensional modeling device 10 as a sixth embodiment. The three-dimensional modeling device 10 is provided with an ejection nozzle 11, the material feeding device 20, the plasticizing section 120, a stage 300, a displacement mechanism 400, and a control section 500*f*. The three-dimensional modeling device 10 according to the present embodiment plasticizes the material fed from the material feeding device 20 with the plasticizing section 120, and then ejects the material thus plasticized toward the stage 300 from the ejection nozzle 11.

The displacement mechanism 400 is configured to be able to change a relative position between the ejection nozzle 11 and the stage 300. In the present embodiment, the displacement mechanism 400 displaces the stage 300 without displacing the ejection nozzle 11. The displacement mechanism 400 is formed of a triaxial positioner for moving the stage 300 in triaxial directions, namely the X, Y, and Z directions with driving forces of three motors. The displacement mechanism 400 is controlled by the control section 500*f*. It should be noted that in another embodiment, it is possible to displace the ejection nozzle 11 without displacing the stage 300, or it is possible to displace both of the ejection nozzle 11 and the stage 300.

The control section 500*f* is formed of a computer or the like similarly to the control section 500 in the first embodiment. The control section 500*f* controls the displacement mechanism 400 and the plasticizing section 120 in accordance with modeling data obtained in advance to thereby eject the material thus plasticized at an arbitrary position on the stage 300 from the ejection nozzle 11, and thus, models a three-dimensional shaped article. It should be noted that the three-dimensional shaped article is also referred to simply as a shaped article in some cases.

Similarly to the first embodiment, the plasticizing section 120 heats the material while conveying the material toward the communication hole 146 due to the rotation of the rotor 130 by the drive motor 122 and the heating by the heating section 148 to thereby plasticize the material, and then discharges the plasticized material from the communication hole 146. The plasticized material discharged from the communication hole 146 flows to the ejection nozzle 11.

The material feeding device 20 according to the present embodiment is configured similarly to the first embodiment. It should be noted that even when the material feeding device 20 is provided to the three-dimensional modeling device 10 as in the present embodiment, the material feeding device 20 can adopt any of the configurations of the first embodiment through the fifth embodiment described above.

According to the three-dimensional modeling device 10 according to the sixth embodiment described above, there is provided the material feeding device 20 similarly to the first embodiment, the material feeding device 20 is configured to be able to take the communicated state when the hopper 30 is located in the first area R1, and to take the non-communicated state when the hopper 30 is located in the second area R2, and the non-communicated state is taken at least when the hopper 30 is detached from the coupling member 50 via the detachably attaching part 64. Therefore, when the hopper 30 is detached from the coupling member 50 or the hopper 30 is in the detached state, the possibility that a foreign matter enters the plasticizing section 120 via the feed hole 79 decreases.

G. Other Embodiments (G-1) In the embodiments described above, the second member 80 is provided with the lid part 81 and the wall part 82. In contrast, it is possible for the second member 80 to have, for example, only a portion corresponding to the lid part 81 for covering the opening part 37 in the detached state, but not to have the wall part 82.

(G-2) In the embodiment described above, the second member 80 has the second engagement part 83 configured to be able to engage with the first engagement part 34 of the hopper 30. In contrast, the hopper 30 is not required to have the first engagement part 34, and further, the second member 80 is not required to have the second engagement part 83.

(G-3) In the first embodiment through the fourth embodiment, the second area R2 is disposed adjacent to the slide surface 61. In contrast, the second area R2 is not required to be disposed adjacent to the slide surface 61. In other words, the detachably attaching part 64 is not required to be disposed adjacent to the slide surface 61. For example, it is possible for the second area R2 to be located on the slide surface 61.

(G-4) In the first embodiment through the fourth embodiment described above, in the attached state, the upper surface of the lid part 81 of the second member 80 is located at the same height as the slide surface 61. In contrast, in the attached state, the upper surface of the lid part 81 is not required to be located at the same height as the slide surface 61. For example, in the attached state, the second member 80 can be located below the opening part 37, and the lid part 81 can be located below the slide surface 61. Further, in the attached state, the second member 80 can be located above the opening part 37, and the upper surface of the lid part 81 can be located above the slide surface 61.

(G-5) In the embodiment described above, the material feeding device 20 is provided with the second member 80. In contrast, the material feeding device 20 is not required to be provided with the second member 80.

H. Other Aspects

The present disclosure is not limited to the embodiments described above, but can be implemented in a variety of aspects within the scope or the spirit of the present disclosure. For example, the present disclosure can also be implemented in the following aspects. The technical features in each of the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a material feeding device. The material feeding device includes a hopper which has an opening part, and is configured to contain a material, and a coupling member configured so that the hopper is detachably attached to the coupling member, wherein the coupling member includes a slide surface having a first area where a feed hole is disposed, a first member configured to make a sliding displacement on the slide surface, and a detachably attaching part which is disposed in a second area extending along a direction in which the first area extends, and with which the hopper is detachably attached to the coupling member. In the attached state in which the hopper is attached to the coupling member, there is adopted a configuration in which when the hopper is located in the first area, the first member makes a sliding displacement to a third area different from the first area to thereby take a communicated state in which the opening part and the feed hole are communicated with each other, there is adopted a configuration in which when the hopper is located in the second area, the first member makes a sliding displacement to the first area to thereby take a non-communicated state in which the first member covers the feed hole, and the non-communicated state is taken at least when the hopper is detached from the coupling member via the detachably attaching part.

According to such an aspect as described above, the possibility that a foreign matter enters the plasticizing section and so on as an external device to be coupled to the material feeding device via the feed hole decreases when the hopper is detached from the coupling member, and in the state in which the hopper is detached from the coupling member.

(2) In the material feeding device according to the aspect described above, the coupling member may include a regulatory part configured to regulate the sliding displacement of the first member in the non-communicated state. According to such an aspect as described above, due to the regulatory part, it is possible to reduce the possibility that the first member makes the sliding displacement from the first area to other areas despite the intention in the non-communicated state, and thus, it is possible to further reduce the possibility that a foreign matter enters the plasticizing section and so on via the feed hole.

(3) In the material feeding device according to the aspect described above, the second area may be located adjacent to the slide surface, the third area may be located at an opposite side to the second area with respect to the first area, and in the attached state, the first member may make a sliding displacement from the first area to the third area in tandem with a first displacement in which the opening part makes a sliding displacement from the second area to the first area to thereby take the communicated state, and the first member may make a sliding displacement from the third area to the first area in tandem with a second displacement in which the opening part makes a sliding displacement from the first area to the second area to thereby take the non-communicated state. According to such an aspect as described above, the sliding displacement of the opening part and the sliding displacement of the first member coordinate with each other, and the possibility that a foreign matter enters the plasticizing section and so on via the feed hole decreases even in the non-communicated state in which the opening part and the feed hole are not communicated with each other, and the transition between the communicated state and the non-communicated state.

(4) In the material feeding device according to the aspect described above, there may further be included a second member which has a lid part covering the opening part in the second area, and which is configured to be detached/attached from/to the detachably attaching part due to detachment/attachment of the hopper from/to the coupling member, wherein the second member may be located in the second area in the attached state. According to such an aspect described above, it is possible to decrease the possibility that a foreign matter enters the plasticizing section and so on via the feed hole, and at the same time, it is possible to decrease the possibility that the material in the hopper scatters via the opening part by a simple operation.

(5) In the material feeding device according to the aspect described above, an upper surface of the lid part may be located at the same height as the slide surface in the attached state. According to such an aspect described above, by the simple operation, it is possible to decrease the possibility that a foreign matter enters the plasticizing section and so on via the feed hole, and at the same time, the scattering of the material when the opening part moves between above the lid part and above the slide surface is suppressed, and thus, the loss of the material is suppressed.

(6) In the material feeding device according to the aspect described above, the second member may have a second engagement part configured to be engaged with a first engagement part of the hopper, and the first engagement part and the second engagement part may be configured so that engagement between the first engagement part and the second engagement part is released by the first displacement, and is achieved by the second displacement. According to such an aspect as described above, it is possible to prevent separation of the second member from the hopper when the hopper is detached from the coupling member or in the state in which the hopper is detached from the coupling member, and further, it is possible to separate the second member from the hopper to open the opening part by the simple operation in the attached state.

(7) In the material feeding device according to the aspect described above, there may further be included a slide mechanism section configured to make the first member make a sliding displacement, wherein the first member may be made by the slide mechanism section to make the sliding displacement from the third area to the first area to thereby make the opening part make a sliding displacement from the first area to the second area. According to such an aspect as described above, it is possible to make the transition of the material feeding device from the communicated state to the non-communicated state by operating the slide mechanism section, and even in the transition from the communicated state to the non-communicated state, the possibility that a foreign matter enters the plasticizing section and so on via the feed hole decreases.

(8) In the material feeding device according to the aspect described above, there may further be included a slide control section configured to control the slide mechanism section to make the first member make a sliding displacement. According to such an aspect as described above, by the control section controlling the slide mechanism section, it is possible to make the transition of the material feeding device from the communicated state to the non-communicated state.

(9) In the material feeding device according to the aspect described above, there may further be included a robot configured to move the hopper to thereby make the opening part make a sliding displacement between the first area and the second area. According to such an aspect as described above, it is possible for the robot to move the hopper to thereby make the opening part make the sliding displacement to switch between the communicated state and the non-communicated state of the material feeding device.

(10) In the material feeding device according to the aspect described above, the coupling member may have a third member which is provided with a coupling hole, and which is configured to make a sliding displacement on the slide surface, the second area may be located on the first area, the third area may be located at an opposite side to a fourth area different from the first area with respect to the first area, and in the attached state, the first member may make a sliding displacement from the first area to the third area in tandem with a third displacement in which the third member makes a sliding displacement from the fourth area to the first area to thereby take the communicated state, and the first member may make a sliding displacement from the third area to the first area in tandem with a fourth displacement in which the third member makes a sliding displacement from the first area to the fourth area to thereby take the non-communicated state. According to such an aspect as described above, the sliding displacement of the third member and the sliding displacement of the first member coordinate with each other, and the possibility that a foreign matter enters the plasticizing section and so on via the feed hole decreases even in the transition between the communicated state and the non-communicated state.

(11) In the material feeding device according to the aspect described above, there may further be included a second member which is configured to be detached/attached from/to the first member due to detachment/attachment of the hopper from/to the coupling member via the detachably attaching part, and which is configured to cover the opening part in the second area, wherein the second member may be configured to be stacked above the first member, and to move in tandem with the sliding displacement of the first member in the attached state. According to such an aspect as described above, it is possible to easily take the communicated state due to the third displacement even when the second member is disposed, and at the same time, it is possible to easily cover the opening part with the second member by the fourth displacement. Therefore, it is possible to decrease the possibility that a foreign matter enters the plasticizing section and so on via the feed hole, and at the same time, it is possible to decrease the possibility that the material in the hopper scatters via the opening part by a simple operation.

(12) In the material feeding device according to the aspect described above, the second member may have a second engagement part configured to be engaged with a first engagement part of the hopper, and the first engagement part and the second engagement part may be configured so that engagement between the first engagement part and the second engagement part is released by the third displacement, and is achieved by the fourth displacement. According to such an aspect as described above, it is possible to prevent separation of the second member from the hopper in the state in which the hopper is detached from the coupling member or when the hopper is detached from the coupling member, and further, it is possible to separate the second member from the hopper to open the opening part by the simple operation in the attached state.

(13) According to a second aspect of the present disclosure, there is provided an injection molding device. The injection molding device includes the material feeding device according to the first aspect described above, a plasticizing section configured to plasticize the material fed from the material feeding device to generate a plasticized material, and an injection nozzle configured to inject the plasticized material into a molding die.

According to such an aspect as described above, the possibility that a foreign matter enters the plasticizing section and so on as an external device to be coupled to the material feeding device via the feed hole decreases when the hopper is detached from the coupling part, and in the state in which the hopper is detached from the coupling member.

(14) According to a third aspect of the present disclosure, there is provided a three-dimensional modeling device. The three-dimensional modeling device includes the material feeding device according to the first aspect described above, a plasticizing section configured to plasticize the material fed from the material feeding device to generate a plasticized material, and an ejection nozzle configured to eject the plasticized material toward a stage.

According to such an aspect as described above, the possibility that a foreign matter enters the plasticizing section and so on as an external device to be coupled to the material feeding device via the feed hole decreases when the hopper is detached from the coupling part, and in the state in which the hopper is detached from the coupling member.

The present disclosure is not limited to the aspects as the material feeding device, the injection molding device, and the three-dimensional modeling device described above, but can be implemented in a variety of aspects. For example, the present disclosure can be implemented as an extrusion molding device, or a variety of devices equipped with a material feeding device.

What is claimed is:

1. A material feeding device comprising:
   a hopper which has an opening part, and is configured to contain a material; and
   a coupling member configured so that the hopper is detachably attached to the coupling member,
   wherein the coupling member includes
   a slide surface having a first area where a feed hole is disposed,
   a first member configured to make a sliding displacement on the slide surface, and
   a detachably attaching part which is disposed in a second area extending along a direction in which the first area extends, and with which the hopper is detachably attached to the coupling member, wherein, in the attached state in which the hopper is attached to the coupling member, there is adopted a configuration in which when the hopper is located in the first area, the first member makes a sliding displacement to a third area different from the first area to thereby take a communicated state in which the opening part and the feed hole are communicated with each other, and there is adopted a configuration in which when the hopper is located in the second area, the first member makes a sliding displacement to the first area to thereby take a non-communicated state in which the first member covers the feed hole, and wherein the non-communicated state is taken at least when the hopper is detached from the coupling member via the detachably attaching part.

2. The material feeding device according to claim 1, wherein
the coupling member includes a regulatory part configured to regulate the sliding displacement of the first member in the non-communicated state.

3. The material feeding device according to claim 1, wherein
the second area is located adjacent to the slide surface,
the third area is located at an opposite side to the second area with respect to the first area, and
in the attached state,
the first member makes a sliding displacement from the first area to the third area in tandem with a first displacement in which the opening part makes a sliding displacement from the second area to the first area to thereby take the communicated state, and
the first member makes a sliding displacement from the third area to the first area in tandem with a second displacement in which the opening part makes a sliding displacement from the first area to the second area to thereby take the non-communicated state.

4. The material feeding device according to claim 3, further comprising:
a second member which has a lid part covering the opening part in the second area, and which is configured to be detached/attached from/to the detachably attaching part due to detachment/attachment of the hopper from/to the coupling member, wherein
the second member is located in the second area in the attached state.

5. The material feeding device according to claim 4, wherein
an upper surface of the lid part is located at a same height as the slide surface in the attached state.

6. The material feeding device according to claim 4, wherein
the second member has a second engagement part configured to be engaged with a first engagement part of the hopper, and
the first engagement part and the second engagement part are configured so that engagement between the first engagement part and the second engagement part is released by the first displacement, and is achieved by the second displacement.

7. The material feeding device according to claim 3, further comprising:
a slide mechanism section configured to make the first member make a sliding displacement, wherein
the first member is made by the slide mechanism section to make the sliding displacement from the third area to the first area to thereby make the opening part make a sliding displacement from the first area to the second area.

8. The material feeding device according to claim 7, further comprising:
a slide control section configured to control the slide mechanism section to make the first member make a sliding displacement.

9. The material feeding device according to claim 3, further comprising:
a robot configured to move the hopper to thereby make the opening part make a sliding displacement between the first area and the second area.

10. The material feeding device according to claim 1, wherein
the coupling member has a third member which is provided with a coupling hole, and which is configured to make a sliding displacement on the slide surface,
the second area is located on the first area,
the third area is located at an opposite side to a fourth area different from the first area with respect to the first area, and
in the attached state,
the first member makes a sliding displacement from the first area to the third area in tandem with a third displacement in which the third member makes a sliding displacement from the fourth area to the first area to thereby take the communicated state, and
the first member makes a sliding displacement from the third area to the first area in tandem with a fourth displacement in which the third member makes a sliding displacement from the first area to the fourth area to thereby take the non-communicated state.

11. The material feeding device according to claim 10, further comprising:
a second member which is configured to be detached/attached from/to the first member due to detachment/attachment of the hopper from/to the coupling member via the detachably attaching part, and which is configured to cover the opening part in the second area, wherein
the second member is configured to be stacked above the first member, and to move in tandem with the sliding displacement of the first member in the attached state.

12. The material feeding device according to claim 11, wherein
the second member has a second engagement part configured to be engaged with a first engagement part of the hopper, and
the first engagement part and the second engagement part are configured so that engagement between the first engagement part and the second engagement part is released by the third displacement, and is achieved by the fourth displacement.

13. An injection molding device comprising:
the material feeding device according to claim 1;
a plasticizing section configured to plasticize the material fed from the material feeding device to generate a plasticized material; and
an injection nozzle configured to inject the plasticized material into a molding die.

14. A three-dimensional modeling device comprising:
the material feeding device according to claim 1;

a plasticizing section configured to plasticize the material fed from the material feeding device to generate a plasticized material; and an ejection nozzle configured to eject the plasticized material toward a stage.

* * * * *